(12) United States Patent
Sato et al.

(10) Patent No.: US 10,032,253 B2
(45) Date of Patent: Jul. 24, 2018

(54) IMAGING APPARATUS, IMAGING SYSTEM, IMAGING METHOD, AND RECORDING MEDIUM

(71) Applicant: Panasonic Intellectual Property Management Co., Ltd., Osaka (JP)

(72) Inventors: Satoshi Sato, Kyoto (JP); Kunio Nobori, Osaka (JP); Takeo Azuma, Kyoto (JP); Ayako Maruyama, Osaka (JP); Nobuhiko Wakai, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 66 days.

(21) Appl. No.: 15/413,749

(22) Filed: Jan. 24, 2017

(65) Prior Publication Data

US 2017/0223324 A1    Aug. 3, 2017

(30) Foreign Application Priority Data

Feb. 2, 2016    (JP) ................. 2016-017599

(51) Int. Cl.
*G06T 3/40*       (2006.01)
*H04N 5/335*     (2011.01)
*H04N 9/04*       (2006.01)

(52) U.S. Cl.
CPC .......... *G06T 3/4015* (2013.01); *H04N 5/335* (2013.01); *H04N 9/045* (2013.01)

(58) Field of Classification Search
CPC ....... G06T 3/4015; H04N 5/335; H04N 9/045
See application file for complete search history.

(56) References Cited

U.S. PATENT DOCUMENTS

| 5,629,734 A | 5/1997 | Hamilton, Jr. et al. |
| 2007/0298164 A1* | 12/2007 | Ogata ............... G02B 3/0018 427/162 |

(Continued)

FOREIGN PATENT DOCUMENTS

WO    2011/063311    5/2011

OTHER PUBLICATIONS

Leonid I. Rudin et al., "Nonlinear total variation based noise removal algorithms", Physica D, vol. 60, pp. 259-268, Nov. 1992.

(Continued)

*Primary Examiner* — Twyler Haskins
*Assistant Examiner* — Fayez Bhuiyan
(74) *Attorney, Agent, or Firm* — Wenderoth, Lind & Ponack, L.L.P.

(57) ABSTRACT

An imaging apparatus includes an optical imaging system that converges light from an object; an imaging device that includes a plurality of pixels, receives the converged light, and converts the received light to an electric signal; a filter unit that is disposed between the optical imaging system and the imaging device and includes a plurality of color filters having different light transmission rate characteristics; and a transmission data compressing circuit that codes the electric signal. An overall light transmission rate characteristic of the filter unit differs randomly in different pixels of the imaging device, and the transmission data compressing circuit weights and codes the electric signal of each of the pixels by using a reciprocal of a proportion of the overall light transmission rate characteristic of the filter unit corresponding to each of the plurality of pixels of the imaging device relative to a wavelength characteristic common among the pixels.

22 Claims, 19 Drawing Sheets

(56) References Cited

U.S. PATENT DOCUMENTS

2008/0304156 A1* 12/2008 Koyama ................ G02B 5/201
  359/588
2011/0249159 A1* 10/2011 Fukunaga .............. G03B 17/00
  348/279

OTHER PUBLICATIONS

Shunsuke Ono et al., "Decorrelated Vectorial Total Variation", IEEE Conference on Computer Vision and Pattern Recognition, Sep. 2014.
Jianwei Ma, "Improved Iterative Curvelet Thresholding for Compressed Sensing and Measurement", IEEE Transactions on Instrumentation and Measurement, vol. 60, No. 1, pp. 126-136, Jan. 2011.
Michal Aharon et al., "K-SVD: An Algorithm for Designing Overcomplete Dictionaries for Sparse Representation", IEEE Transactions on Signal Processing, vol. 54, No. 11, pp. 4311-4322, Nov. 2006.
Daisuke Kiku et al., "Minimized-Laplacian residual interpolation for color image demosaicking", IS & T/SPIE Electronic Imaging, Feb. 2014.

* cited by examiner

FIG. 11

|       | u=1 | u=2 | u=3 | u=4 |
|-------|-----|-----|-----|-----|
| v=1   | y1,1 | y2,1 | y3,1 | y4,1 |
| v=2   | y1,2 | y2,2 | y3,2 | y4,2 |
| v=3   | y1,3 | y2,3 | y3,3 | y4,3 |
| v=4   | y1,4 | y2,4 | y3,4 | y4,4 |

|  | u=1 | u=2 | u=3 | u=4 |
|---|---|---|---|---|
| v=1 | $y_{1,1}$ | $y_{2,1}$ | $y_{3,1}$ | $y_{4,1}$ |
| v=2 | $y_{1,2}$ | $y_{2,2}$ | $y_{3,2}$ | $y_{4,2}$ |
| v=3 | $y_{1,3}$ | $y_{2,3}$ | $y_{3,3}$ | $y_{4,3}$ |
| v=4 | $y_{1,4}$ | $y_{2,4}$ | $y_{3,4}$ | $y_{4,4}$ |

MODULATION IMAGE (b)

| $r_{1,1}$ | $r_{2,1}$ | $r_{3,1}$ | $r_{4,1}$ |
|---|---|---|---|
| $r_{1,2}$ | $r_{2,2}$ | $r_{3,2}$ | $r_{4,2}$ |
| $r_{1,3}$ | $r_{2,3}$ | $r_{3,3}$ | $r_{4,3}$ |
| $r_{1,4}$ | $r_{2,4}$ | $r_{3,4}$ | $r_{4,4}$ |

GENERATED R IMAGE (c)

| $g_{1,1}$ | $g_{2,1}$ | $g_{3,1}$ | $g_{4,1}$ |
|---|---|---|---|
| $g_{1,2}$ | $g_{2,2}$ | $g_{3,2}$ | $g_{4,2}$ |
| $g_{1,3}$ | $g_{2,3}$ | $g_{3,3}$ | $g_{4,3}$ |
| $g_{1,4}$ | $g_{2,4}$ | $g_{3,4}$ | $g_{4,4}$ |

GENERATED G IMAGE (d)

| $b_{1,1}$ | $b_{2,1}$ | $b_{3,1}$ | $b_{4,1}$ |
|---|---|---|---|
| $b_{1,2}$ | $b_{2,2}$ | $b_{3,2}$ | $b_{4,2}$ |
| $b_{1,3}$ | $b_{2,3}$ | $b_{3,3}$ | $b_{4,3}$ |
| $b_{1,4}$ | $b_{2,4}$ | $b_{3,4}$ | $b_{4,4}$ |

GENERATED B IMAGE

FIG. 20

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

IMAGING APPARATUS, IMAGING SYSTEM, IMAGING METHOD, AND RECORDING MEDIUM

BACKGROUND

1. Technical Field

The present disclosure relates to an imaging apparatus, an imaging system, and an imaging method that employ a compressed sensing technique and to a recording medium.

2. Description of the Related Art

Capturing a color image requires three different pieces of wavelength information on red (R), green (G), and blue (B) corresponding to the three primary colors of light. Meanwhile, an imaging apparatus captures a color image with a single imaging device. In a conventional technique, an imaging apparatus captures a color image with a single imaging device by using a single color filter. In the present disclosure, a filter that allows visible light in a specific wavelength band to pass therethrough and blocks visible light in another specific wavelength band or a filter that allows radiation in the entire visible light wavelength band to pass therethrough is called a color filter. The aforementioned single color filter includes areas that correspond to respective pixels of the imaging device. These areas corresponding to the respective pixels each transmit light in one of red (R), green (G), and blue (B) wavelength bands. As a distribution pattern of red (R), green (G), and blue (B) in the aforementioned single color filter, a Bayer array illustrated in FIG. 20 has been widely employed. In a Bayer array, a color filter is designed such that the G pixels, which are close to the vision characteristics of human eyes, occupy one-half of all the pixels and the R pixels and the B pixels each occupy one-fourth of all the pixels. The imaging apparatus acquires wavelength information on any one of red (R), green (G), and blue (B) in each of the pixels of the imaging device by using such a single color filter. Then, a color image generating apparatus reconstructs a color image from the wavelength information received from the imaging apparatus through processing called demosaicing.

U.S. Pat. No. 5,629,734 discloses (column 2, lines 52-57) an imaging system provided with a color filter of the above-described Bayer array. The input unit of the imaging system disclosed in U.S. Pat. No. 5,629,734 can acquire only a single piece of wavelength information on red (R), green (G), or blue (B) in each of the pixels of an imaging device. Thus, a data interpolation and recording unit of the imaging system disclosed in U.S. Pat. No. 5,629,734 carries out data interpolation of the wavelength information when reconstructing a color image in a digital signal processor (column 1, lines 54-60; column 4, lines 15-33). However, information on a color that is not acquired is interpolated artificially through the data interpolation on the basis of the information on the other colors, and thus a false color can be introduced.

Japanese Unexamined Patent Application Publication (Translation of PCT Application) No. 2013-511924 discloses an image processing system that includes a single color filter. In this single color filter, red (R), green (G), and blue (B) are distributed in a random pattern in areas corresponding to the respective pixels of an imaging device (paragraph 0032, paragraph 0042, FIG. 13). Therefore, only a single piece of wavelength information on red (R), green (G), or blue (B) can be acquired in each of the pixels of the imaging device. An optical converter in the image processing system disclosed in Japanese Unexamined Patent Application Publication (Translation of PCT Application) No. 2013-511924 generates a sample data set by converting and sampling optical characteristics of an original image obtained with an image sensor (paragraphs 0027 and 0028). Then, a data processing device of the image processing system disclosed in Japanese Unexamined Patent Application Publication (Translation of PCT Application) No. 2013-511924 reconstructs a color image by applying a compressed sensing technique to the sample data set (paragraph 0030). In Japanese Unexamined Patent Application Publication (Translation of PCT Application) No. 2013-511924, as in U.S. Pat. No. 5,629,734, information on a color that has not been acquired needs to be interpolated artificially from the information on the other colors, and thus a false color can be introduced.

The above-described conventional techniques require further improvement as described above.

SUMMARY

In one general aspect, the techniques disclosed here feature an imaging apparatus, and the imaging apparatus includes an optical imaging system that converges light from an object; an imaging device that includes a plurality of pixels, the imaging device receiving the converged light and converting the received light to an electric signal; a plurality of color filters disposed between the optical imaging system and the imaging device, the plurality of color filters having different light transmission rate characteristics; and a transmission data compressing circuit that codes the electric signal. An overall light transmission rate characteristic of the plurality of color filters differs randomly in different pixels of the imaging device, and the transmission data compressing circuit weights and codes the electric signal of each of the pixels by using a reciprocal of a proportion of the overall light transmission rate characteristic of the plurality of color filters corresponding to each of the plurality of pixels of the imaging device relative to a wavelength characteristic that is common among the pixels.

It is to be noted that general or specific embodiments of the above may be implemented in the form of a system, a method, an integrated circuit, a computer program, or a computer-readable recording medium, or through any desired combination of an apparatus, a system, a method, an integrated circuit, a computer program, and a computer-readable recording medium. A computer-readable recording medium includes, for example, a nonvolatile recording medium, such as a Compact Disc-Read Only Memory (CD-ROM).

According to the present disclosure, further improvement can be made. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 is a schematic diagram illustrating a raster scan order to be used to describe the processing of coding a weighted electric signal;

FIG. 13 is a schematic diagram illustrating an exemplary modulation image and exemplary generated images when the number N of the pixels in an imaging device is set to 16;

FIG. 20 is a schematic diagram illustrating a Bayer array.

DETAILED DESCRIPTION

Underlying Knowledge Forming Basis of the Present Disclosure

First, with reference to FIGS. 1A through 1D, points to be noted in an aspect of the present disclosure will be described.

Figure 1A:
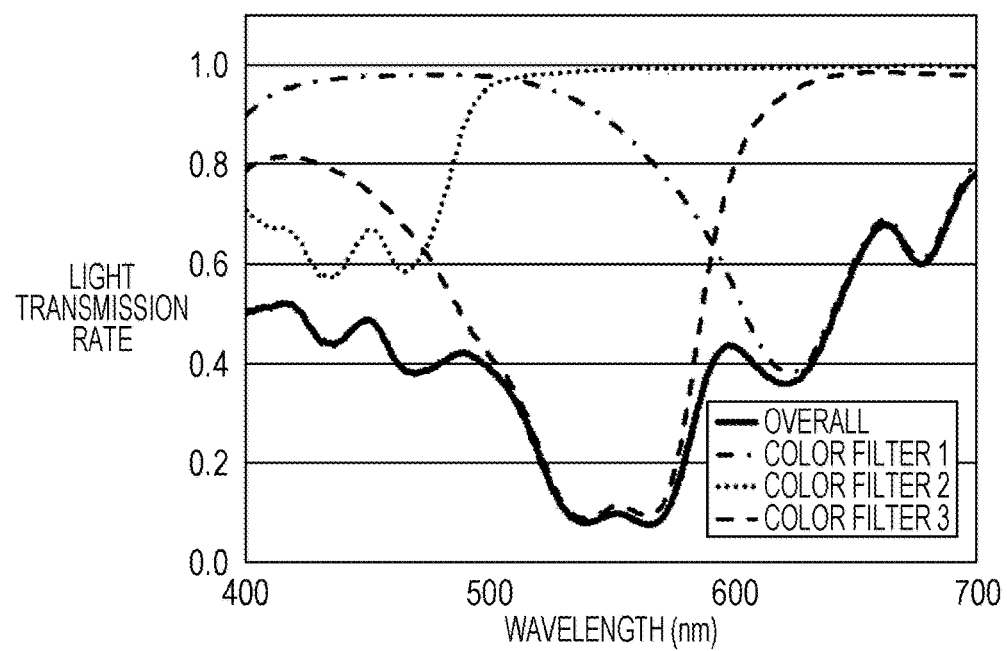
FIG. 1A illustrates an example of a light transmission rate characteristic of each of a plurality of color filters corresponding to a first pixel and of an overall light transmission rate characteristic.
Figure 1B:
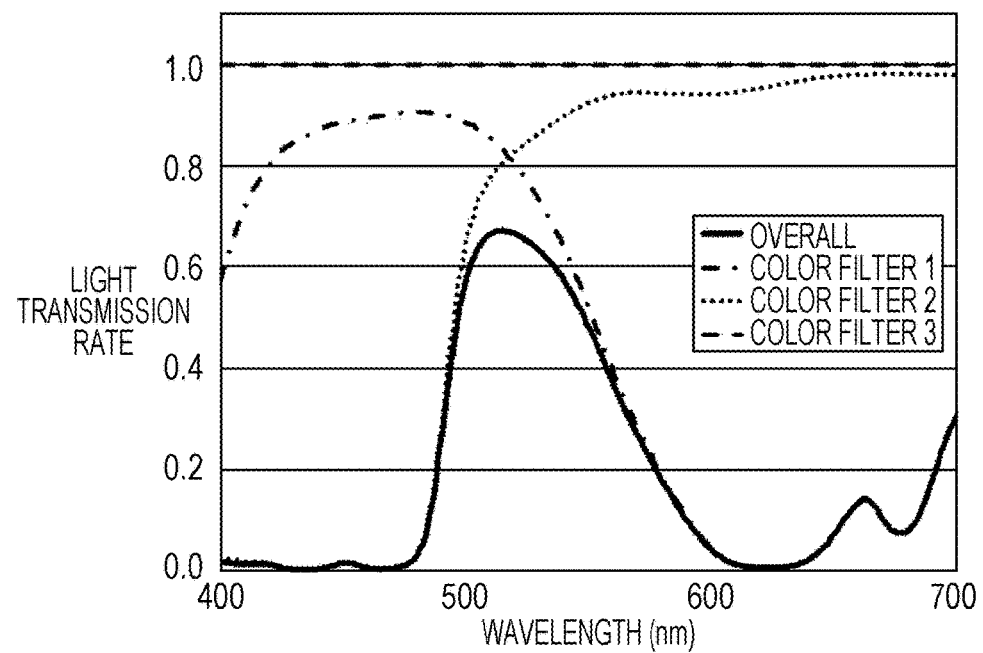
FIG. 1B illustrates an example of a light transmission rate characteristic of each of a plurality of color filters corresponding to a second pixel, which is different from the first pixel, and of an overall light transmission rate characteristic.

FIG. 1A illustrates a light transmission rate characteristic of each of a plurality of color filters 1 through 3 corresponding to a first pixel of an imaging device and an overall light transmission rate characteristic of the plurality of color filters 1 through 3 corresponding to the first pixel of the imaging device. FIG. 1B illustrates a light transmission rate characteristic of each of the plurality of color filters 1 through 3 corresponding to a second pixel, which is different from the first pixel, and an overall light transmission rate characteristic of the plurality of color filters 1 through 3 corresponding to the second pixel of the imaging device. The thickness of the color filter 1 corresponding to the first pixel differs from the thickness of the color filter 1 corresponding to the second pixel, the thickness of the color filter 2 corresponding to the first pixel differs from the thickness of the color filter 2 corresponding to the second pixel, and the thickness of the color filter 3 corresponding to the first pixel differs from the thickness of the color filter 3 corresponding to the second pixel. In addition, "the overall light transmission rate characteristic of the plurality of color filters 1 through 3 corresponding to the first pixel of the imaging device" is, for example, "the light transmission rate characteristic in a case in which light is transmitted through the color filter 1, the color filter 2, and the color filter 3 corresponding to the first pixel of the imaging device." Here, the overall light transmission rate characteristic of the plurality of color filters 1 through 3 corresponding to the first pixel illustrated in FIG. 1A differs from the overall light transmission rate characteristic of the plurality of color filters 1 through 3 corresponding to the second pixel illustrated in FIG. 1B in any portion of the entire wavelength band. In other words, in the present aspect, the overall light transmission rate characteristic of the plurality of color filters 1 through 3 differs randomly in different pixels and at different wavelengths.

In a similar manner, the light transmission rate characteristic of each of the plurality of color filters 1 through 3 corresponding to the first pixel illustrated in FIG. 1A differs from the light transmission rate characteristic of each of the plurality of color filters 1 through 3 corresponding to the second pixel illustrated in FIG. 1B in any portion of the entire wavelength band. In other words, in the present aspect, the light transmission rate characteristics of the plurality of color filters 1 through 3 differ randomly in different pixels and at different wavelengths. A reason why the overall light transmission rate characteristic of the plurality of color filters 1 through 3 differs randomly in different pixels and at different wavelengths as described above is that the plurality of color filters 1 through 3 having such light transmission rate characteristics are being combined. FIG. 1A corresponds to the first pixel, and FIG. 1B corresponds to the second pixel. These, however, are examples, and the overall light transmission rate characteristic of the plurality of color filters 1 through 3 differs randomly in different pixels and at different wavelengths in pixels other than the first pixel and the second pixel.

A reason why the randomness of the overall light transmission rate characteristic of the plurality of color filters 1 through 3 is enhanced in different pixels and at different wavelengths is that, when an original color image is reproduced by using a compressed sensing technique in an image generating apparatus to which a coded electric signal is input from the imaging apparatus of the present aspect, the original color image can be reproduced with higher accuracy as the randomness is higher.

Light from an object is transmitted through the plurality of color filters 1 through 3 and is received by an imaging device. The optical intensity of the received light is converted to an electric signal by the imaging device.

Here, unlike the present aspect, the conventional techniques disclosed in U.S. Pat. No. 5,629,734 and Japanese Unexamined Patent Application Publication (Translation of PCT Application) No. 2013-511924 employ a single color filter that transmits light in any one of red (R), green (G), and blue (B) wavelength bands in a given pixel. Therefore, the light transmission rate characteristic is the same among the pixels that transmit light in the wavelength band of R within the single color filter. In a similar manner, the light transmission rate characteristic is the same among the pixels that transmit light in the wavelength band of G within the single color filter, and the light transmission rate characteristic is the same among the pixels that transmit light in the wavelength band of B within the single color filter. In addition, when an object is a natural object, it can be assumed that the intensity of the light from the object typically does not change sharply. Consequently, the difference in the optical intensity among the neighboring pixels that have received the light transmitted through the same wavelength band as red (R) in the single color filter is small because the light transmission rate characteristics of the transmitting color filters are the same and the optical intensity does not change sharply among the neighboring light beams. In a similar manner, the difference in the optical intensity among the neighboring pixels that have received the light transmitted through the same wavelength band as green (G) or the difference in the optical intensity among the neighboring pixels that have received the light transmitted through the same wavelength band as blue (B) is small because the light transmission rate characteristic of each of green (G) and blue (B) is the same and the optical intensity does not change sharply among the neighboring light beams. Utilizing the above, the conventional technique calculates the difference between the electric signals in each of the red (R), green (G), and blue (B) wavelength bands and compresses the electric signals. In this manner, it is speculated that, in the conventional technique, the electric signal is compressed for each light transmission rate characteristic of the color filter, and the compression efficiency is increased accordingly.

In contrast, in the imaging apparatus of the present aspect, first, the plurality of color filters 1 through 3 are provided so as to correspond to the respective pixels of the imaging device, in order to increase the reproducibility of a color image. Here, the overall light transmission rate characteristic of the plurality of color filters 1 through 3 differs randomly in different pixels. Therefore, as light from an object is transmitted through the plurality of color filters 1 through 3, the optical intensity of the light from the object varies randomly in different pixels. Thus, unlike the conventional technique described above, the electric signal cannot be compressed for each light transmission rate characteristic of the color filter. Therefore, measures for improving the compression efficiency and improving the transmission efficiency while enhancing the reproducibility of a color image need to be taken.

Thus, the present inventor has conceived of weighting an electric signal of each pixel by using a reciprocal of the proportion of the overall light transmission rate characteristic of the plurality of color filters corresponding to each of the plurality of pixels of the imaging device relative to a wavelength characteristic that is common among the pixels. With this, the electric signal corresponding to each pixel is converted to a value that is based on the wavelength characteristic that is common among the pixels.

A technical significance of weighting the electric signal corresponding to each pixel transmitted through the plurality of color filters by using the reciprocal of the proportion of the overall light transmission rate characteristic of the plurality of color filters corresponding to each pixel relative to the wavelength characteristic that is common among the pixels will be described.

Here, the wavelength characteristic that is common among the pixels is a wavelength characteristic that serves as a reference to be used in common among the pixels of the imaging device when weighting an electric signal and is indicated by a relationship between each wavelength band and the value of the light transmission rate or the like.

Figure 1C:
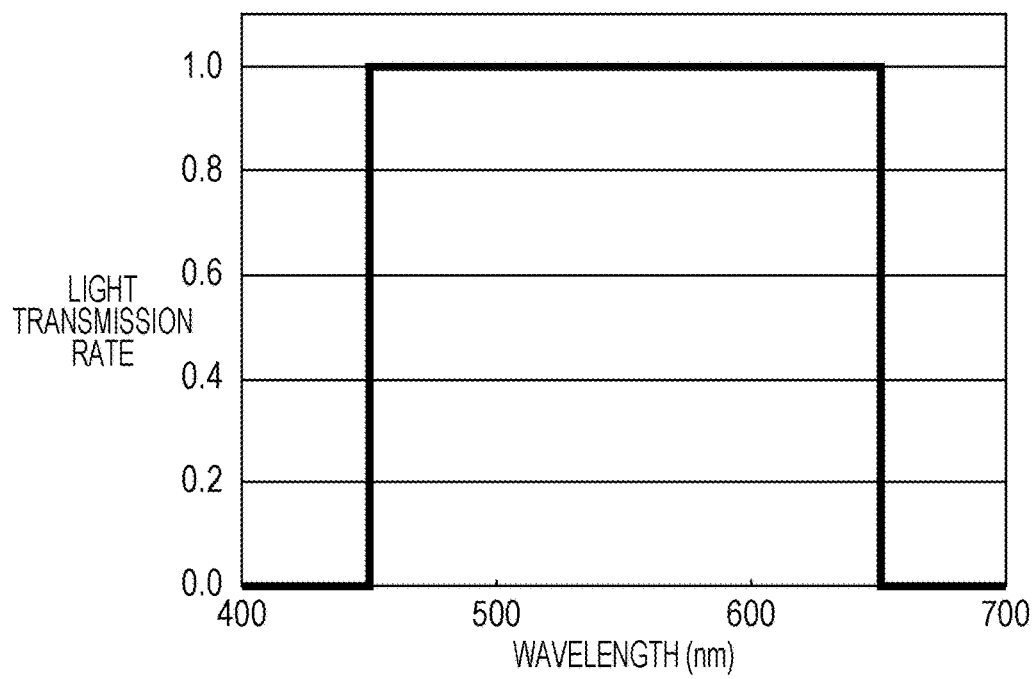
FIG. 1C illustrates an example of a light transmission rate characteristic of a virtual color filter of which the light transmission rate characteristic is the same in all the wavelength bands corresponding to red (R), green (G), and blue (B)

For example, it is conceivable to use, as the wavelength characteristic that is common among the pixels, the light transmission rate characteristic in which the light transmission rate is the same in all the wavelength bands corresponding to red (R), green (G), and blue (B). Here, that "the light transmission rate is the same in all the wavelength bands corresponding to red (R), green (G), and blue (B)" may mean that "the light transmission rate in the wavelength band of red light, the light transmission rate in the wavelength band of green light, and the light transmission rate in the wavelength band of blue light are equal to one another." FIG. 1C illustrates an example of a light transmission rate characteristic of a virtual color filter in which the light transmission rates are the same in all the wavelength bands corresponding to red (R), green (G), and blue (B). In FIG. 1C, the horizontal axis represents the wavelength, and the vertical axis represents the light transmission rate. FIG. 1C illustrates an exemplary case in which the light transmission rate is 1 in the wavelength band ranging from 450 nm to 650 nm. To be more specific, the light transmission rate is 1 in a portion of the wavelength band of red (R) (e.g., 610 nm to 650 nm), in the wavelength band of green (G) (e.g., 500 nm to 560 nm), and in the wavelength band of blue (B) (e.g., 450 nm to 480 nm).

In addition, the proportion of the overall light transmission rate characteristic of the plurality of color filters corresponding to each pixel relative to the wavelength characteristic that is common among the pixels is calculated through a multiply-accumulate operation of the overall light transmission rate characteristic of the plurality of color filters at positions corresponding to respective pixels and the wavelength characteristic that is common among the pixels.

Figure 1D:
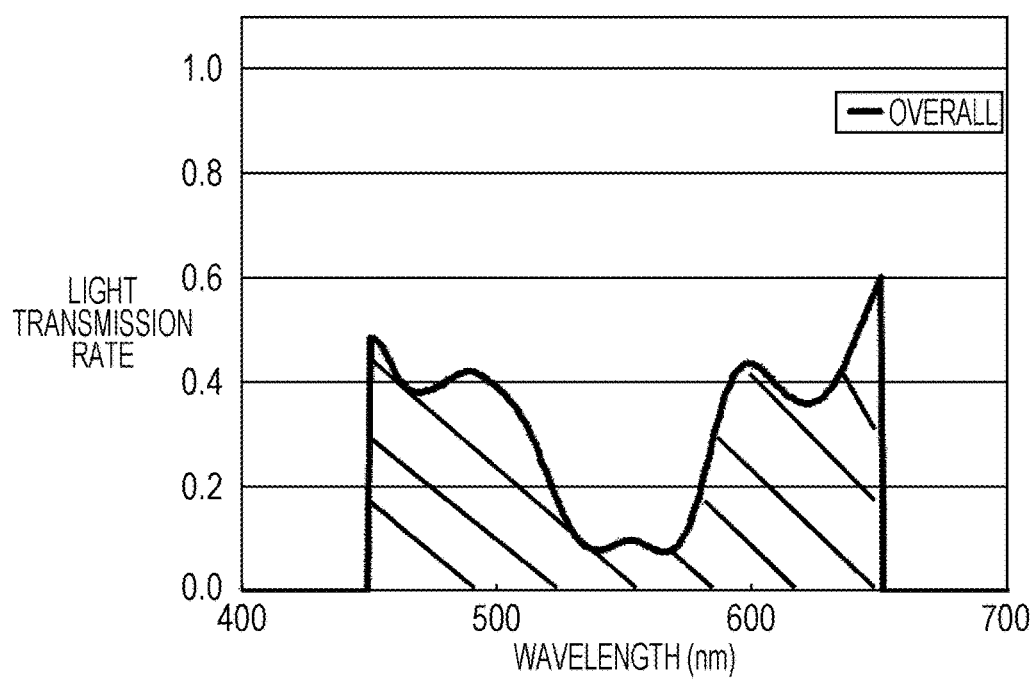
FIG. 1D illustrates an integrated value, represented by an area, obtained through a multiply-accumulate operation of the overall light transmission rate characteristic of the plurality of color filters illustrated in FIG. 1A by using the light transmission rate characteristic illustrated in FIG. 1C.

For example, the sum of products of the overall light transmission rate characteristic of the plurality of color filters corresponding to the first pixel illustrated in FIG. 1A and the wavelength characteristic that is common among the pixels illustrated in FIG. 1C takes a value obtained by integrating the overall light transmission rate characteristic of the plurality of color filters illustrated in FIG. 1A within a wavelength band of from 450 nm to 650 nm because the light transmission rate in the wavelength band of from 450 nm to 650 nm, for example, is 1 in FIG. 1C as described above. FIG. 1D illustrates an integrated value, represented by an area, obtained through a multiply-accumulate operation of the overall light transmission rate characteristic of the plurality of color filters illustrated in FIG. 1A by using the light transmission rate characteristic illustrated in FIG. 1C. In FIG. 1D, the integrated value corresponds to the area of the shaded portion.

On the basis of the premise described thus far, first, the proportion of the overall light transmission rate characteristic of the plurality of color filters corresponding to each pixel relative to the wavelength characteristic that is common among the pixels is calculated for all of the overall light transmission rate characteristics of the plurality of color filters corresponding to each of the pixels.

Specifically, for example, when the wavelength characteristic illustrated in FIG. 1C is used as the wavelength characteristic that is common among the pixels, the proportion of the overall light transmission rate characteristic of the plurality of color filters corresponding to the first pixel illustrated in FIG. 1A relative to the wavelength characteristic that is common among the pixels illustrated in FIG. 1C is calculated for the overall light transmission rate characteristic of the plurality of color filters corresponding to the first pixel illustrated in FIG. 1A. In addition, the proportion of the overall light transmission rate characteristic of the plurality of color filters corresponding to the second pixel illustrated in FIG. 1B relative to the wavelength characteristic that is common among the pixels illustrated in FIG. 1C is calculated for the overall light transmission rate characteristic of the plurality of color filters corresponding to the second pixel illustrated in FIG. 1B. In a similar manner, the proportion of the overall light transmission rate characteristic of the plurality of color filters corresponding to each pixel relative to the wavelength characteristic that is common among the pixels illustrated in FIG. 1C is calculated for the overall light transmission rate characteristic of the plurality of color filters corresponding to each pixel other than the first pixel and the second pixel.

"The proportion of the overall light transmission rate characteristic of the plurality of color filters corresponding to the first pixel relative to the wavelength characteristic that is common among the pixels" is, for example, "the area of the shaded portion illustrated in FIG. 1D." It is to be noted that "the overall light transmission rate characteristic of the plurality of color filters corresponding to the first pixel" is the characteristic labeled as "overall, or in other words, indicated by the solid thick line" in FIG. 1A, and "the wavelength characteristic that is common among the pixels" is the characteristic indicated in FIG. 1C.

Thus, an individual characteristic of each pixel represented by the overall light transmission rate characteristic of the plurality of color filters corresponding to each pixel can be grasped relatively in terms of its relationship to a characteristic common among the pixels represented by the wavelength characteristic that is common among the pixels.

This, however, is still not sufficient. It is because the electric signal corresponding to each pixel is still an electric signal as-is that has been acquired with the overall light transmission rate characteristic of the plurality of color filters that differs randomly in different pixels serving as a reference. Therefore, in the present aspect, an electric signal acquired with the individual characteristic of each pixel serving as a reference is converted to a value that is based on the characteristic common among the pixels represented by the wavelength characteristic that is common among the pixels.

In other words, in the present aspect, a reciprocal of the proportion of the overall light transmission rate characteristic of the plurality of color filters corresponding to each pixel relative to the wavelength characteristic that is common among the pixels is calculated. Here, the proportion of the overall light transmission rate characteristic of the plurality of color filters corresponding to each pixel relative to the wavelength characteristic that is common among the pixels indicates the proportion occupied by the overall light transmission rate characteristic of the plurality of color filters corresponding to each pixel with respect to the wavelength characteristic that is common among the pixels. Thus, the reciprocal of the proportion of the overall light transmission rate characteristic of the plurality of color filters corresponding to each pixel relative to the wavelength characteristic that is common among the pixels indicates the proportion occupied by the wavelength characteristic that is common among the pixels with respect to the overall light transmission rate characteristic of the plurality of color filters corresponding to each pixel. Therefore, multiplying an electric signal acquired with the overall light transmission rate characteristic of the plurality of color filters corresponding to each pixel serving as a reference by the reciprocal of the proportion of the overall light transmission rate characteristic of the plurality of color filters corresponding to each pixel relative to the wavelength characteristic that is common among the pixels, or in other words, weighting the electric signal makes it possible to convert the electric signal corresponding to each pixel to a value that is based on the wavelength characteristic that is common among the pixels.

Specifically, for example, when the light transmission rate characteristic illustrated in FIG. 1C is used as the wavelength characteristic that is common among the pixels, as illustrated in FIGS. 1A and 1B as examples, weighting the electric signal corresponding to each pixel acquired with the overall light transmission rate characteristic of the plurality of color filters corresponding to each pixel made to differ randomly makes it possible to convert the electric signal corresponding to each pixel to a value that is based on the wavelength characteristic that is common among the pixels illustrated in FIG. 1C.

With this, the weighted electric signal is approximated to an electric signal obtained by using a color filter having the wavelength characteristic that is common among the pixels. In other words, in the present aspect, it is possible to consider that the overall light transmission rate characteristic of the plurality of color filters that differs in different pixels is substantially converted to a wavelength characteristic that is the same at all the positions corresponding to the respective pixels, or in other words, is substantially converted to the wavelength characteristic that is common among the pixels through the weighting. In this manner, the weighted electric signals corresponding to the respective pixels each have a value that is based on the wavelength characteristic that is common among the pixels or a value approximated thereto. Thus, the compressibility comparable to that of the conventional technique that calculates the difference in the electric signal between pixels with the same light transmission rate characteristic and enhances the compressibility can be achieved. As a result, according to the present aspect, by taking the difference between the weighted electric signals, the reproducibility of a color image can be increased, and a decrease in the transmission efficiency associated therewith can be prevented.

As described thus far, even in a case in which the electric signal is acquired with the use of a plurality of color filters of which the light transmission rate characteristics are made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

In light of the considerations described above, the present inventors have conceived of the embodiments disclosed hereinafter.

Overview of Embodiments of the Present Disclosure

An imaging apparatus according to an aspect of the present disclosure includes:
  an optical imaging system that converges light from an object;
  an imaging device that includes a plurality of pixels, the imaging device receiving the converged light and converting the received light to an electric signal;
  a filter unit disposed between the optical imaging system and the imaging device, the filter unit including a plurality of color filters having a first group of different light transmission rate characteristics; and
  a transmission data compressing circuit that codes the electric signal,
  wherein an overall light transmission rate characteristic of the filter unit differs randomly in different pixels of the imaging device, and
  wherein the transmission data compressing circuit weights and codes the electric signal of each of the pixels by using a reciprocal of a proportion of the overall light transmission rate characteristic of the filter unit corresponding to each of the plurality of pixels of the imaging device relative to a wavelength characteristic that is common among the pixels.

According to an aspect of the present disclosure, a filter unit that includes a plurality of color filters having a first group of different light transmission rate characteristics is provided. When a single color filter of which the light transmission rate characteristic mutually differs in different pixels as in a conventional Bayer array is used, information on a color that is not acquired is interpolated from information on the other colors when a color image is reproduced, which results in an occurrence of a false color. In contrast, in the present aspect, light that includes information on all the colors is received from an object, and thus an occurrence of a false color can be prevented while preventing a decrease in the resolution.

In addition, the overall light transmission rate characteristic of the filter unit differs randomly in different pixels of the imaging device. This is because the light transmission rate characteristics of the plurality of color filters at each wavelength included in the filter unit are made to differ randomly at positions corresponding to the respective pixels of the imaging device. As a result, the overall light transmission rate characteristic of the filter unit that includes the plurality of color filters differs randomly not only in different pixels but also at different wavelengths. With this, the light transmission rate characteristic of the light from the object is made to differ randomly and multiplicatively in different pixels and at different wavelengths. A reason why the randomness is increased in this manner is that the original color image can be reproduced with higher accuracy as the randomness is higher in an image generating apparatus to which a coded electric signal is input from the imaging apparatus of the present aspect. Specifically, a color image is generated in the image generating apparatus with the use of a compressed sensing technique, and the difference between the reconstructed data and the original data becomes smaller in the compressed sensing technique as the data is sampled in a more random state when the data is sampled. In light of this feature, the randomness is increased multiplicatively in different pixels and at different wavelengths as described above.

Furthermore, the transmission data compressing circuit weights and codes the electric signal of each of the pixels by using the reciprocal of the proportion of the overall light transmission rate characteristic of the filter unit corresponding to each of the plurality of pixels of the imaging device relative to the wavelength characteristic that is common among the pixels. With this, the weighted electric signal is approximated to an electric signal obtained by using a color filter having the wavelength characteristic that is common among the pixels. In this manner, the weighted electric signals corresponding to the respective pixels each have a value that is based on the wavelength characteristic that is common among the pixels. Thus, the compressibility comparable to that of the conventional technique that calculates the difference in the electric signal between pixels with the same light transmission rate characteristic and enhances the compressibility can be achieved. With this, even in a case in which an electric signal is acquired with the use of a filter unit of which the light transmission rate characteristic is made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

Meanwhile, in the image generating apparatus to which the coded electric signal is input from the imaging apparatus of the present aspect, as long as the reciprocal of the proportion of the overall light transmission rate characteristic of the filter unit corresponding to each of the plurality of pixels of the imaging device relative to the wavelength characteristic that is common among the pixels has been obtained, the coded electric signal can be restored to an original unweighted electric signal. As a result, even in a case in which the electric signal is acquired with the use of a filter unit of which the light transmission rate characteristic is made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

EMBODIMENTS

Hereinafter, embodiments of the present disclosure will be described with reference to the drawings. It is to be noted that the constituent elements that are identical across the drawings are given identical reference characters.

First Embodiment

Overall Configuration

Figure 2:
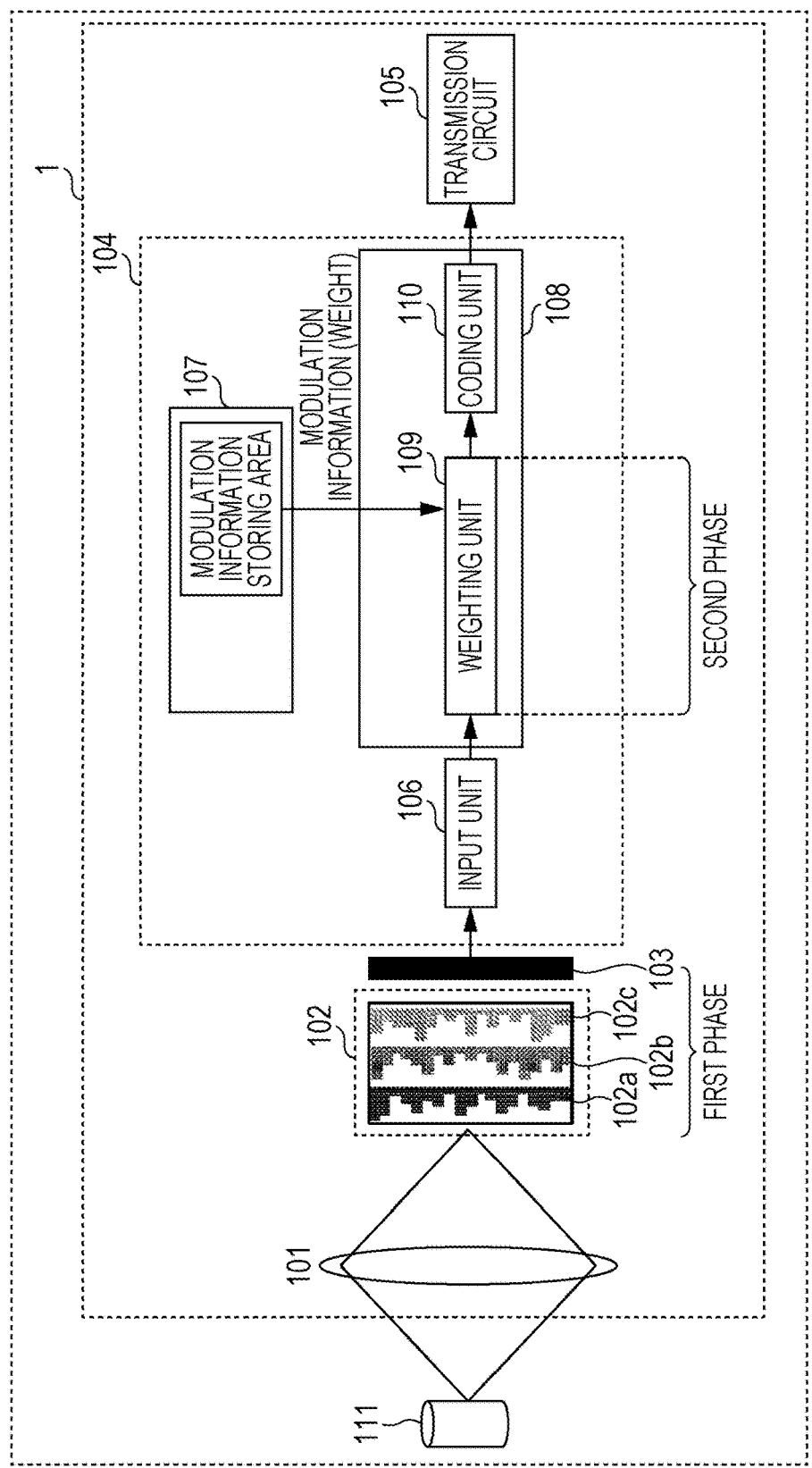
FIG. 2 is a schematic block diagram illustrating an imaging apparatus according to a first embodiment of the present disclosure.

FIG. 2 is a schematic block diagram illustrating an imaging apparatus according to a first embodiment of the present disclosure. As illustrated in FIG. 2, an imaging apparatus 1 includes an optical imaging system 101, a filter unit 102, an imaging device 103, a transmission data compressing circuit 104, and a transmission circuit 105. The imaging apparatus 1 receives light from an object 111. The "light from the object 111" means light reflected by the object 111 or light emitted by the object 111.
Optical Imaging System 101

The optical imaging system 101 includes at least a lens and a lens position adjusting mechanism. In FIG. 2, the lens converges the light from the object 111 and forms an image of the object 111 on the imaging device 103. The optical imaging system 101 may include a single lens or a plurality of lenses.

The lens position adjusting mechanism, which is not illustrated, is a mechanism for adjusting the imaging position of the lens. As the lens position adjusting mechanism, for example, an actuator that adjusts the lens position and a control circuit (controller) that controls the drive amount of the actuator can be used.
Filter Unit 102

As illustrated in FIG. 2, the filter unit 102 includes a plurality of color filters having different light transmission rate characteristics, or in other words, includes a color filter 102a, a color filter 102b, and a color filter 102c. The filter unit 102 may further include an optical element aside from the color filter 102a, the color filter 102b, and the color filter 102c. The filter unit 102 is disposed in an optical path through which light incident on the optical imaging system 101 reaches the imaging device 103. Typically, the filter unit 102 is disposed in contact with the front surface of the imaging device 103. "The front surface of the imaging device 103" may be defined herein as an upper surface of the imaging device 103 or a light-receiving surface of the imaging device 103 as well.

The filter unit 102 is used to receive the light to be incident on the imaging device 103 randomly in terms of the wavelength as well as the space. The color filters 102a through 102c correspond to three color filters corresponding, for example, to the three primary colors of a coloring material, or in other words, correspond to a color filter corresponding to a wavelength band of cyan (C), a color filter corresponding to a wavelength band of magenta (M), and a color filter corresponding to a wavelength band of yellow (Y).

In addition, as illustrated in FIG. 2, the color filters 102a through 102c each include a cut film. Here, a cut film refers to a film constituted by laminating, to a desired thickness, layers each made of a material having a predetermined light absorption rate characteristic.

Figure 7:
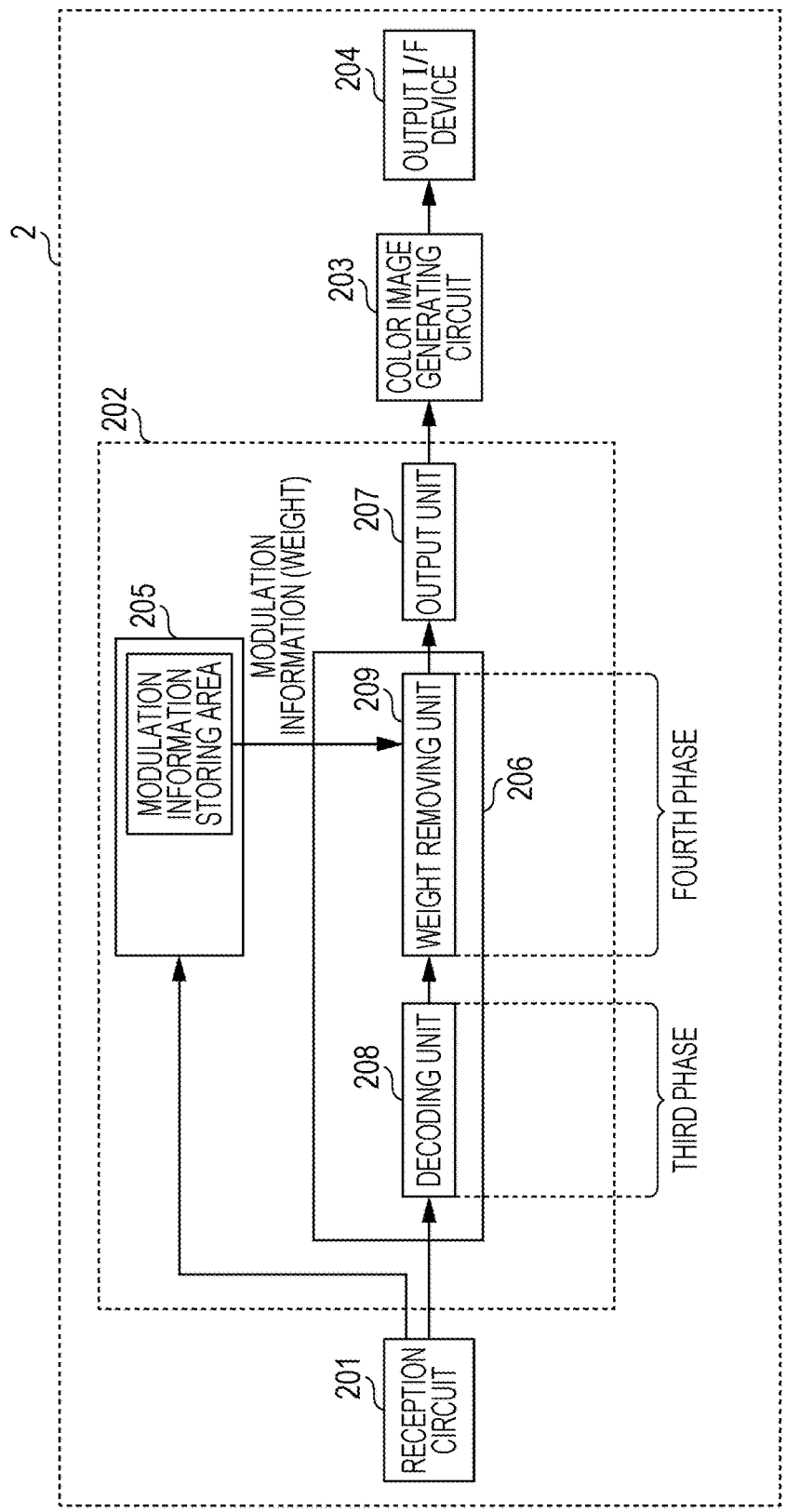
FIG. 7 is a schematic block diagram illustrating an image generating apparatus used in an imaging system according to the first embodiment of the present disclosure.

The thickness of each of the color filters 102a through 102c is not uniform, as illustrated in FIG. 2. Here, the "thickness" corresponds to the length of the cut film of each color filter along the direction parallel to the optical axis of the light transmitted through each color filter. In this manner, as the thickness of each of the color filters 102a through 102c is made to differ randomly in different pixels, the overall light transmission rate characteristic of the filter unit 102 differs randomly in different pixels and at different wavelengths. This is for increasing the reproducibility of a color image in an image generating apparatus (FIG. 7).

In this manner, in the present embodiment, as a first phase, the overall light transmission rate characteristic of the filter unit 102 is made to differ randomly in different pixels and at different wavelengths, and the light from the object 111 is transmitted through the filter unit 102. Thus, the optical intensity of the light from the object 111 is varied randomly in different pixels. With this, the reproducibility of a color image can be increased in the image generating apparatus (FIG. 7).

Although FIG. 2 illustrates the filter unit 102 in which three color filters are combined, this is merely an example. The number of color filters to be combined is not limited to three. The filter unit 102 will be described later in further detail.
Imaging Device 103

In FIG. 2, the imaging device 103 includes a plurality of pixels. The imaging device 103 receives the light converged by the optical imaging system 101 at each of the plurality of pixels and converts the received light to an electric signal. The electric signal is acquired in each pixel. Hereinafter, the electric signal acquired by the imaging device 103 may also be referred to as a "modulation image." The imaging device 103 is disposed at a focal length of the lens.
Transmission Data Compressing Circuit 104

In FIG. 2, the transmission data compressing circuit 104 includes an input unit 106, a memory 107, and a control unit 108. The input unit 106 receives the electric signal of each pixel acquired by the imaging device 103 from the imaging device 103.

In FIG. 2, the memory 107 stores the reciprocal of the proportion of the overall light transmission rate characteristic of the filter unit 102 corresponding to each pixel relative to the wavelength characteristic that is common among the pixels (hereinafter, this may be referred to as "weight"). Information that indicates this "weight" is referred to as "modulation information." The modulation information will be described later in further detail.

In FIG. 2, the control unit 108 includes a weighting unit 109 and a coding unit 110. The weighting unit 109 weights the electric signal by using the modulation information. The coding unit 110 codes the weighted electric signal to carry out data compression.

In this manner, in the present embodiment, as a second phase, the value of the electric signal corresponding to each pixel is weighted and is thus approximated to an electric signal obtained with the use of a color filter having the wavelength characteristic that is common among the pixels. With this, even in a case in which the electric signal is acquired with the use of the filter unit 102 of which the light transmission rate characteristic is made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

Figure 10:
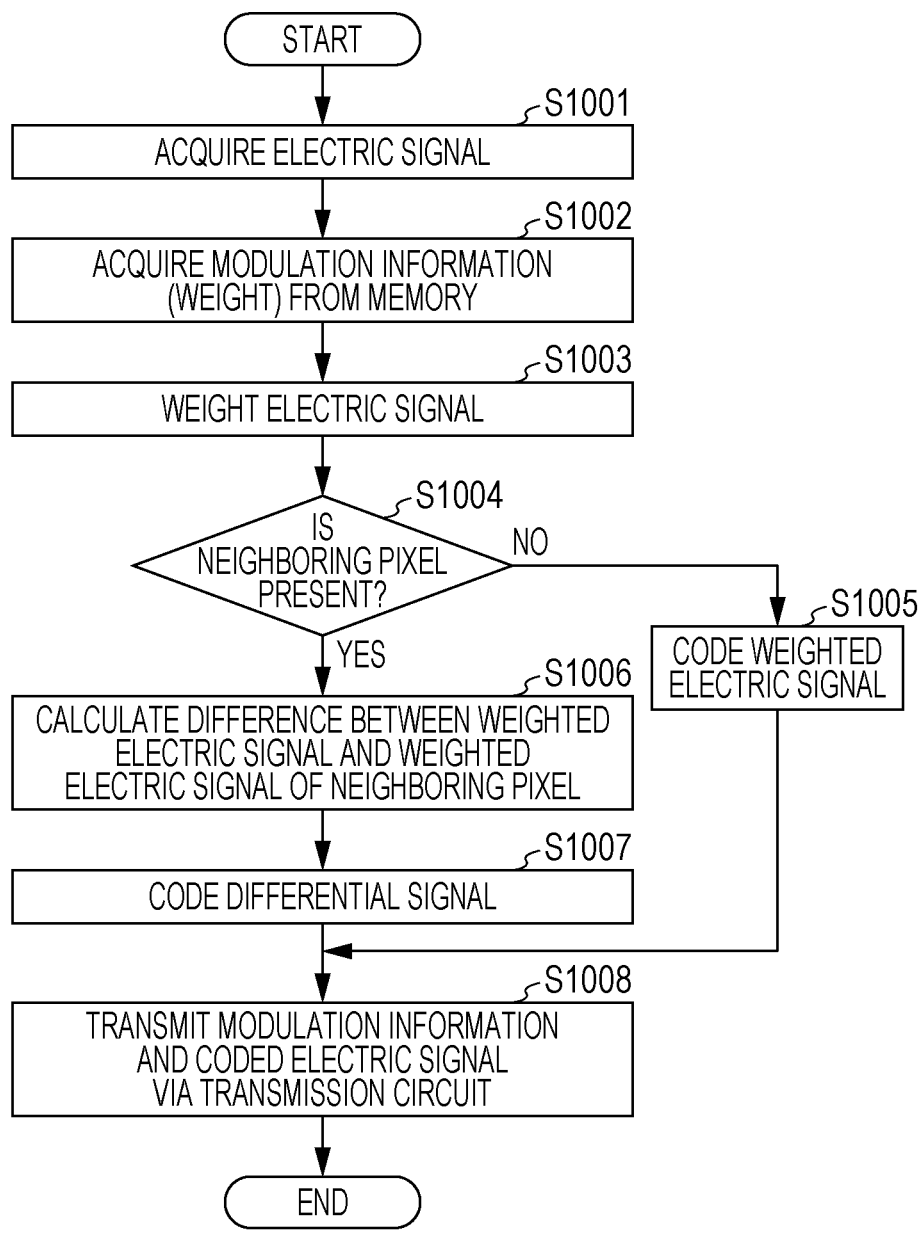
FIG. 10 is a flowchart illustrating processing of coding an electric signal in the imaging apparatus according to the first embodiment of the present disclosure.

It is to be noted that the weighting and the coding described above will be described later in further detail (FIG. 10).

Transmission Circuit 105

In FIG. 2, the transmission circuit 105 transmits the modulation information and the coded electric signal coded by the transmission data compressing circuit 104 to the image generating apparatus (FIG. 7) that is external to the imaging apparatus 1. The transmission may be carried out either through a cable or wirelessly. In the present embodiment, the assumption is that the modulation information and the coded electric signal are exchanged and processed between the imaging apparatus 1 and the image generating apparatus (FIG. 7) in substantially real time. However, a storage device (e.g., hard disk drive) that stores the coded electric signal may further be provided aside from the memory 107 that stores the modulation information, and thus the processing may be carried out in non-real time.

Next, with reference to FIGS. 2 through 5, the filter unit 102 will be described in further detail.

Figure 3:
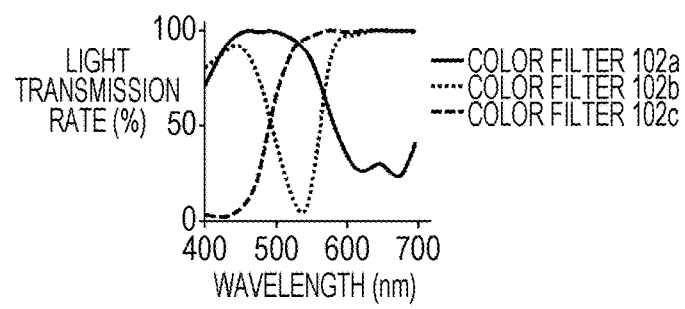
FIG. 3 illustrates exemplary light transmission rate characteristics of a first group of a color filter 102a, a color filter 102b, and a color filter 102c.

FIG. 3 illustrates exemplary light transmission rate characteristics of the color filter 102a, the color filter 102b, and the color filter 102c. As illustrated in FIG. 3, the color filters 102a through 102c have different light transmission rate characteristics. The term "different light transmission rate characteristics" as used herein means that the light transmission rate differs at different wavelength bands.

In addition, as illustrated in FIG. 3, the light transmission rate characteristic of each of the color filters 102a through 102c does not change even when the thickness of each color filter changes at any wavelength, or in other word, the light absorption rate is 0%. Specifically, for example, in FIG. 3, the wavelength band in which the light transmission rate of the color filter 102a is 100% is around the wavelength of 450 nm, the wavelength band in which the light transmission rate of the color filter 102b is 100% is around the wavelength of 640 nm, and the wavelength band in which the light transmission rate of the color filter 102c is 100% is around the wavelength of 580 nm. In addition, the light transmission rate of each of the color filters 102a through 102c is 100%, or in other words, the light absorption rate is 0%.

It is ideal that the light absorption rate be "0%" at any of the wavelengths. However, even a cut film having a light absorption rate of a several percent can function as a cut film according to the present embodiment. For example, in reality, as long as the light absorption rate falls within a range of from 0% to 2%, the light absorption rate can be regarded as 0%. In a similar manner, it is ideal that the light transmission rate be "100%" at any of the wavelengths. However, as long as the light transmission rate falls within a range of no less than 98% nor more than 100%, the light transmission rate can be regarded as 100%.

In FIG. 2, the color filters 102a through 102c are laminated together in this order. For example, when the description is provided with the color filter 102c taken as an example, to serve as a support when the color filter 102b is laminated, the color filter 102c may be filled, at a portion in which the cut film is not present therein, with an optical member that substantially does not affect the light transmission rate or the light absorption rate of the color filter 102c. The same applies to the color filter 102a and the color filter 102b. Thus, the optical characteristic of each cut film determines the optical characteristic of each of the color filters 102a through 102c.

Next, the relationship among the light transmission rate characteristic of the filter unit 102, the light transmission rate characteristics of the color filters 102a through 102c, and the thickness of the cut films therein will be described. The light transmission rate characteristic of the cut film in the color filter 102a at the wavelength λ is represented by C1(λ), the light transmission rate characteristic of the cut film in the color filter 102b at the wavelength λ is represented by C2(λ), and the light transmission rate characteristic of the cut film in the color filter 102c at the wavelength λ is represented by C3(λ). In addition, the thickness of the cut film in the color filter 102a corresponding to a pixel position (u,v) is represented by T1(u,v), the thickness of the cut film in the color filter 102b is represented by T2(u,v), and the thickness of the cut film in the color filter 102c is represented by T3(u,v). In this case, the overall light transmission rate characteristic x(λ, u,v) of the filter unit 102 corresponding to the pixel position (u,v) is expressed by the following expression (1). For simplifying the description, the thickness of the cut film is referred to as "the thickness of the color filter" for convenience.

$$x(\lambda,u,v)=\phi(C1(\lambda),T1(u,v))\cdot\phi(C2(\lambda),T2(u,v))\cdot\phi(C3(\lambda),T3(u,v)) \quad (1)$$

In the above, $\phi(C(\lambda),T(u,v))$ is a function that indicates the light transmission rate at the wavelength λ determined by the light transmission rate characteristic C(λ) of the color filter and the thickness T(u,v) of the color filter. In addition, $\phi(C(\lambda),T(u,v))$ is a function that takes a fixed value when the light absorption rate included in C(λ) is 0 or when T(u,v) is 0. Specifically, normally, as the thickness of the color filter increases, the light transmission rate decreases. However, when the light absorption rate of the color filter is 0, the light transmission rate takes a fixed value regardless of the thickness of the color filter. In addition, in the case of (T(u,v)=0) in which the color filter is not disposed, the light transmission rate takes a fixed value as well.

On the basis of the expression (1), by making the thickness of each of the color filters 102a through 102c differ randomly in different pixels, the filter unit 102 of which the light transmission rate characteristic differs randomly in different pixels and at different wavelengths can be achieved. Here, that "the light transmission rate characteristic differs randomly in different pixels and at different wavelengths" means that the absolute value of the correlation coefficient of the light transmission rate in the area corresponding to a first plurality of pixels in the imaging device 103 and the light transmission rate in the area corresponding to a second plurality of pixels that differs from the area corresponding to the first plurality of pixels is less than one in different pixels and at different wavelengths. The absolute value of the correlation coefficient may be approximately 0 to 0.2.

Figure 4:
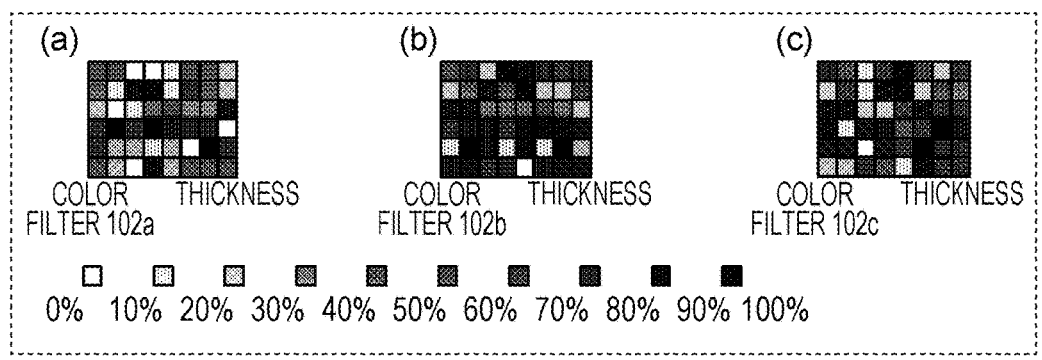
FIG. 4 is a schematic diagram illustrating an example of each color filter in which the thickness of each pixel is set such that the thickness of 0% to the thickness of 100% are distributed uniformly.

Here, the thickness of each of the color filters 102a through 102c is set to be distributed uniformly from the thickness of 0% (the filter is not disposed) to the maximum thickness of 100%. Here, that "the thickness is distributed uniformly from the thickness of 0% to 100%" means a distribution in which the thickness of 0% to the thickness of 100% appears at an equal frequency. FIG. 4 is a schematic diagram illustrating an example of each color filter in which the thickness of each pixel is set to be distributed uniformly in a range from the thickness of 0% to 100%. FIG. 4(a) is a schematic diagram illustrating an example of the thickness of the color filter 102a at the positions corresponding to the respective pixels of the imaging device 103. FIG. 4(b) is a schematic diagram illustrating an example of the thickness of the color filter 102b at the positions corresponding to the respective pixels of the imaging device 103. FIG. 4(c) is a schematic diagram illustrating an example of the thickness of the color filter 102c at the positions corresponding to the respective pixels of the imaging device 103. As illustrated in FIGS. 4(a) through 4(c), the thickness of each color filter at the positions corresponding to the respective pixels of the imaging device 103 differs randomly in different pixels. In this manner, by setting the thickness of each color filter at the positions corresponding to the respective pixels of the imaging device 103 in accordance with the random numbers according to a uniform distribution, or in other words, in accordance with uniformly random numbers, the filter unit 102 of which the light transmission rate characteristic differs randomly in different pixels and at different wavelengths in accordance with the expression (1) can be achieved.

Here, in the conventional technique disclosed in Japanese Unexamined Patent Application Publication (Translation of PCT Application) No. 2013-511924, a single color filter in which red (R), green (G), and blue (B) areas are disposed randomly and each given pixel transmits light in any one of the red (R), green (G), and blue (B) wavelength bands is used. Therefore, the light transmission rate characteristic is the same among the pixels that transmit light in the wavelength band of R within the single color filter. In a similar manner, the light transmission rate characteristic is the same among the pixels that transmit light in the wavelength band of G within the single color filter, and the light transmission rate characteristic is the same among the pixels that transmit light in the wavelength band of B within the single color filter. Thus, with the conventional technique disclosed in Japanese Unexamined Patent Application Publication (Translation of PCT Application) No. 2013-511924, the light transmission rate characteristic differs randomly in different pixels, but the light transmission rate characteristic does not differ randomly at different wavelengths.

In contrast, in the present embodiment, the filter unit 102 is configured as described above, and thus random sampling through the uniformly random numbers can be achieved not only in different pixels but also at different wavelengths.

Figure 5:
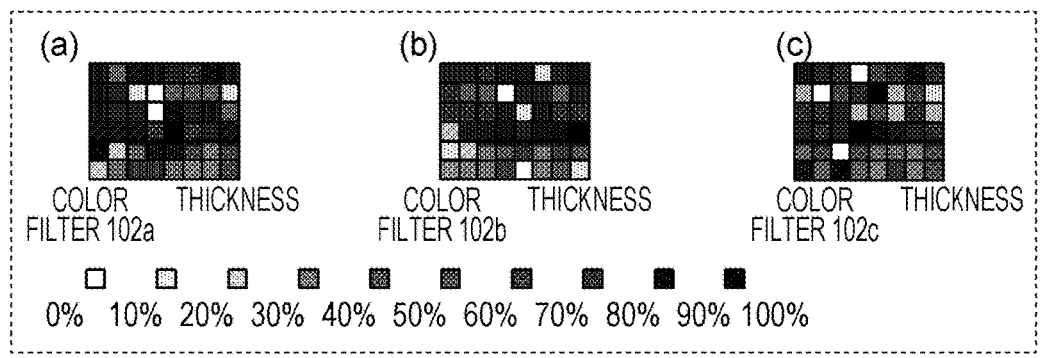
FIG. 5 is a schematic diagram illustrating an example of each color filter in which the thickness of each pixel is set so as to have a normal distribution (Gaussian distribution) with the mean at the thickness of 50%.

It is to be noted that a distribution other than the uniform distribution may be used to set the thickness of each color filter. For example, the thickness may be set to have a normal distribution (Gaussian distribution) with the mean at the thickness of 50%. FIG. 5 is a schematic diagram illustrating an example of each color filter in which the thickness of each pixel is set to be distributed normally (Gaussian distribution) with the mean at the thickness of 50%. FIG. 5(a) is a schematic diagram illustrating an example of the thickness of the color filter 102a at the positions corresponding to the respective pixels of the imaging device 103. FIG. 5(b) is a schematic diagram illustrating an example of the thickness of the color filter 102b at the positions corresponding to the respective pixels of the imaging device 103. FIG. 5(c) is a schematic diagram illustrating an example of the thickness of the color filter 102c at the positions corresponding to the respective pixels of the imaging device 103. As illustrated in FIGS. 5(a) through 5(c), the thickness of each color filter at the positions corresponding to the respective pixels of the imaging device 103 differs randomly in different pixels. In this manner, by setting the thickness of each color filter at the positions corresponding to the respective pixels of the imaging device 103 in accordance with the random numbers according to a normal distribution, or in other words, in accordance with the normally distributed random numbers, the filter unit 102 of which the light transmission rate characteristic differs randomly in different pixels and at different wavelengths in accordance with the expression (1) can be achieved. With this, random sampling through the normally distributed random numbers can be achieved in different pixels and at different wavelengths.

Next, with regard to the wavelength characteristic that is common among the pixels that serves as a reference when weighting an electric signal, an example other than the light transmission rate characteristic in which the light transmission rate is the same in all the wavelength bands corresponding to red (R), green (G), and blue (B) illustrated in FIG. 1C will be described.

Figure 6A:
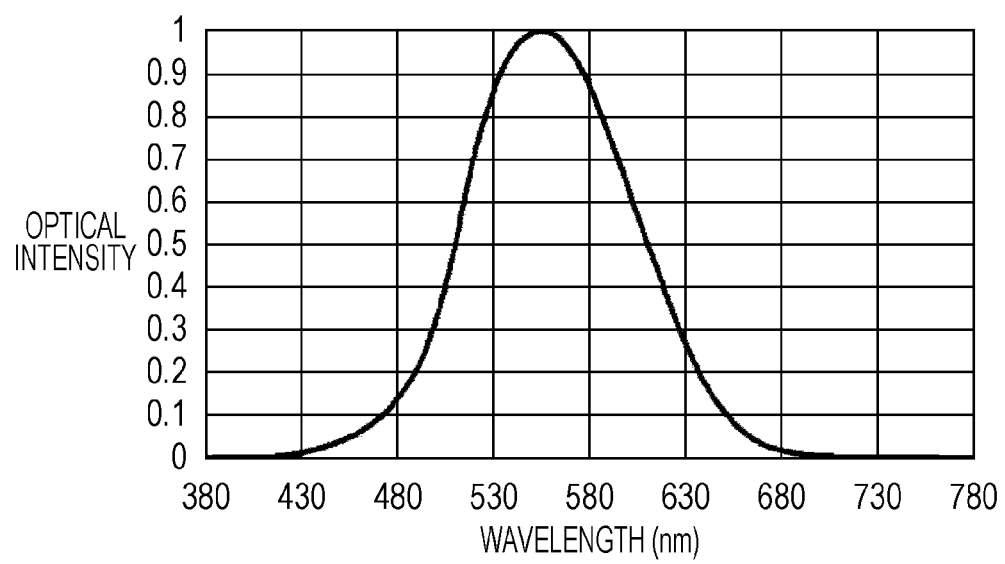
FIG. 6A illustrates an example of a wavelength characteristic representing the spectral luminous efficiency.

FIG. 6A illustrates a wavelength characteristic representing the spectral luminous efficiency as an example of the wavelength characteristic that is common among the pixels. The spectral luminous efficiency represents, in a numerical value, the intensity at which human eyes perceive the brightness of light at each wavelength. In the aforementioned wavelength characteristic, as illustrated in FIG. 6A, the optical intensity is high in the wavelength band around 550 nm corresponding to green (G).

Figure 6B:
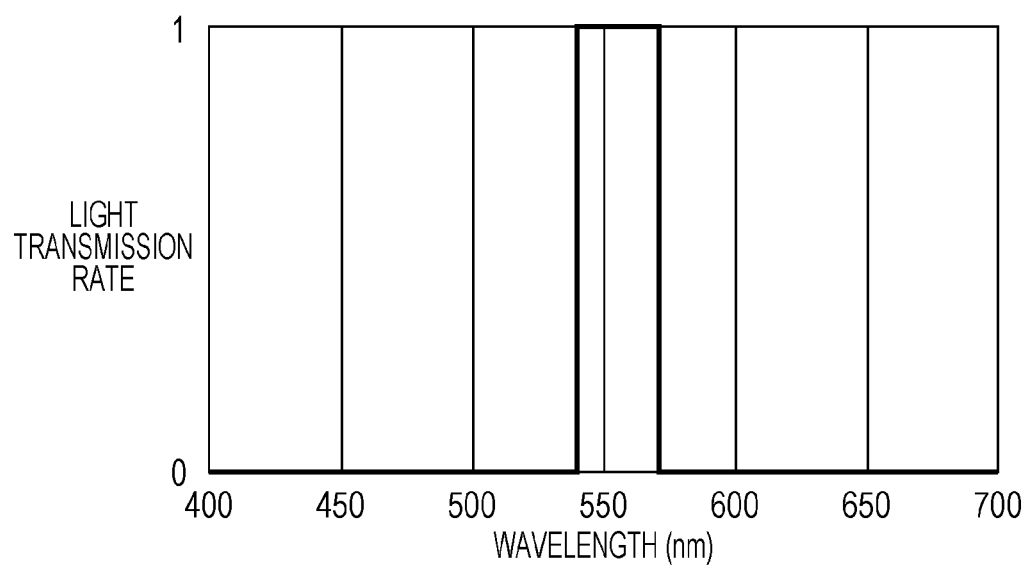
FIG. 6B illustrates an example of a light transmission rate characteristic of a virtual color filter of which the light transmission rates are 0 in the wavelength bands corresponding to red (R) and blue (B) and the light transmission rate exceeds 0 only in the wavelength band corresponding to green (G)

FIG. 6B illustrates an example of a light transmission rate characteristic of a virtual color filter in which the light transmission rate is 0 in the wavelength bands corresponding to red (R) and blue (B) and the light transmission rate exceeds 0 only in the wavelength band corresponding to green (G). In other words, this light transmission rate characteristic is identical to the light transmission rate characteristic of a band-pass filter for the wavelength band corresponding to green (G). In the light transmission rate characteristic, as illustrated in FIG. 6B, the light transmission rate is 1 in a wavelength band around 550 nm corresponding to green (G), and the light transmission rate is 0 in wavelength bands other than the stated wavelength band.

Figure 6C:
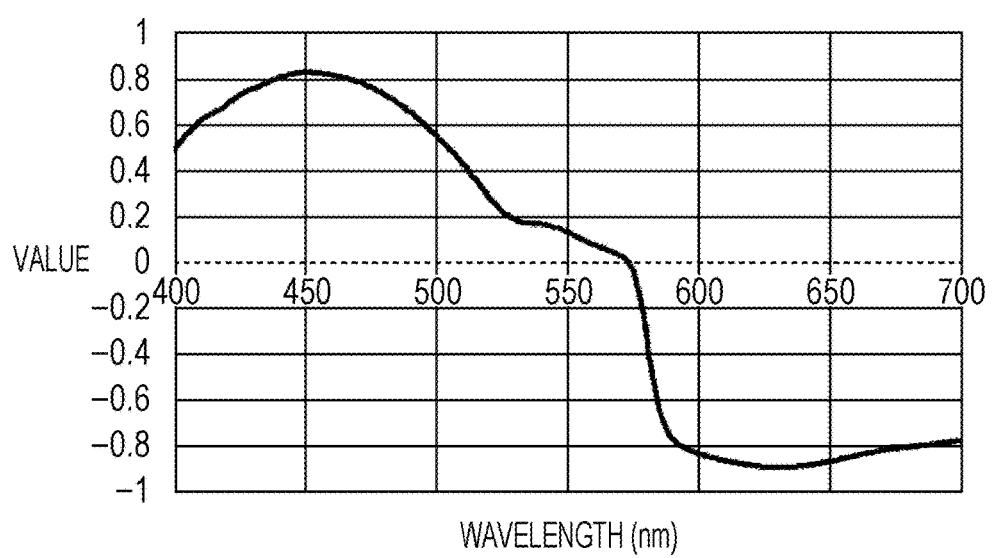
FIG. 6C illustrates an example of a wavelength characteristic representing a differential characteristic between a red characteristic and a blue characteristic.

FIG. 6C illustrates an example of a wavelength characteristic representing a differential characteristic between a red characteristic and a blue characteristic. This wavelength characteristic indicates the difference between the red characteristic and the blue characteristic, or in other words, indicates the color difference. In the wavelength characteristic, as illustrated in FIG. 6C, the value is greater than 0 in a wavelength band in which the wavelength is shorter than approximately 570 nm, and the value is smaller than 0 in a wavelength band in which the wavelength is longer than approximately 570 nm.

It is to be noted that the wavelength characteristics illustrated in FIGS. 1C and 6A through 6C are merely examples, and the wavelength characteristic that is common among the pixels is not limited to these examples.

Next, with reference to FIG. 7, an image generating apparatus used in an imaging system according to an embodiment of the present disclosure will be described.

FIG. 7 is a schematic block diagram illustrating an image generating apparatus 2 used in the imaging system according to the first embodiment of the present disclosure. As illustrated in FIG. 7, the image generating apparatus 2 includes a reception circuit 201, a received data decoding circuit 202, a color image generating circuit 203, and an output interface device 204.

Reception Circuit 201

The reception circuit 201 receives modulation information and a coded electric signal output from the imaging apparatus 1. The communication between the reception circuit 201 and the transmission circuit 105 may be carried out through a cable or wirelessly. Even when the transmission circuit 105 transmits the modulation information and the coded electric signal through a cable, the reception circuit 201 may receive these pieces of information wirelessly via a device that converts wired communication to wireless communication. This also works in the other way round.

Received Data Decoding Circuit 202

As illustrated in FIG. 7, the received data decoding circuit 202 includes a memory 205, a control unit 206, and an output unit 207. The memory 205 stores the modulation information received from the reception circuit 201.

As illustrated in FIG. 7, the control unit 206 includes a decoding unit 208 and a weight removing unit 209. The decoding unit 208 decodes a coded electric signal (third phase). The weight removing unit 209 removes the weight from the decoded electric signal by using the modulation information acquired from the memory 205 (fourth phase). Here, the third phase corresponds to the second phase in the imaging apparatus 1, and the fourth phase corresponds to the first phase in the imaging apparatus 1. In other words, the decoded electric signal obtained in the third phase corresponds to the weighted electric signal, or in other words, corresponds to a value approximated to an electric signal obtained by using a color filter having the wavelength characteristic that is common among the pixels. Therefore, the reproducibility of the color image cannot be increased yet at this point. Next, in the fourth phase, the weight removing unit 209 removes the weight from the decoded electric signal by using the modulation information, and thus the value held after the light from the object 111 has been transmitted through the filter unit 102 can be obtained.

As a result, as long as the modulation information has been obtained in the image generating apparatus 2 to which the coded electric signal is input from the imaging apparatus 1, the decoded electric signal can be restored to the original unweighted electric signal. In this manner, even in a case in which the image generating apparatus 2 acquires, from the imaging apparatus 1, the electric signal with the use of the filter unit 102 of which the light transmission rate characteristic is made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

Figure 12:
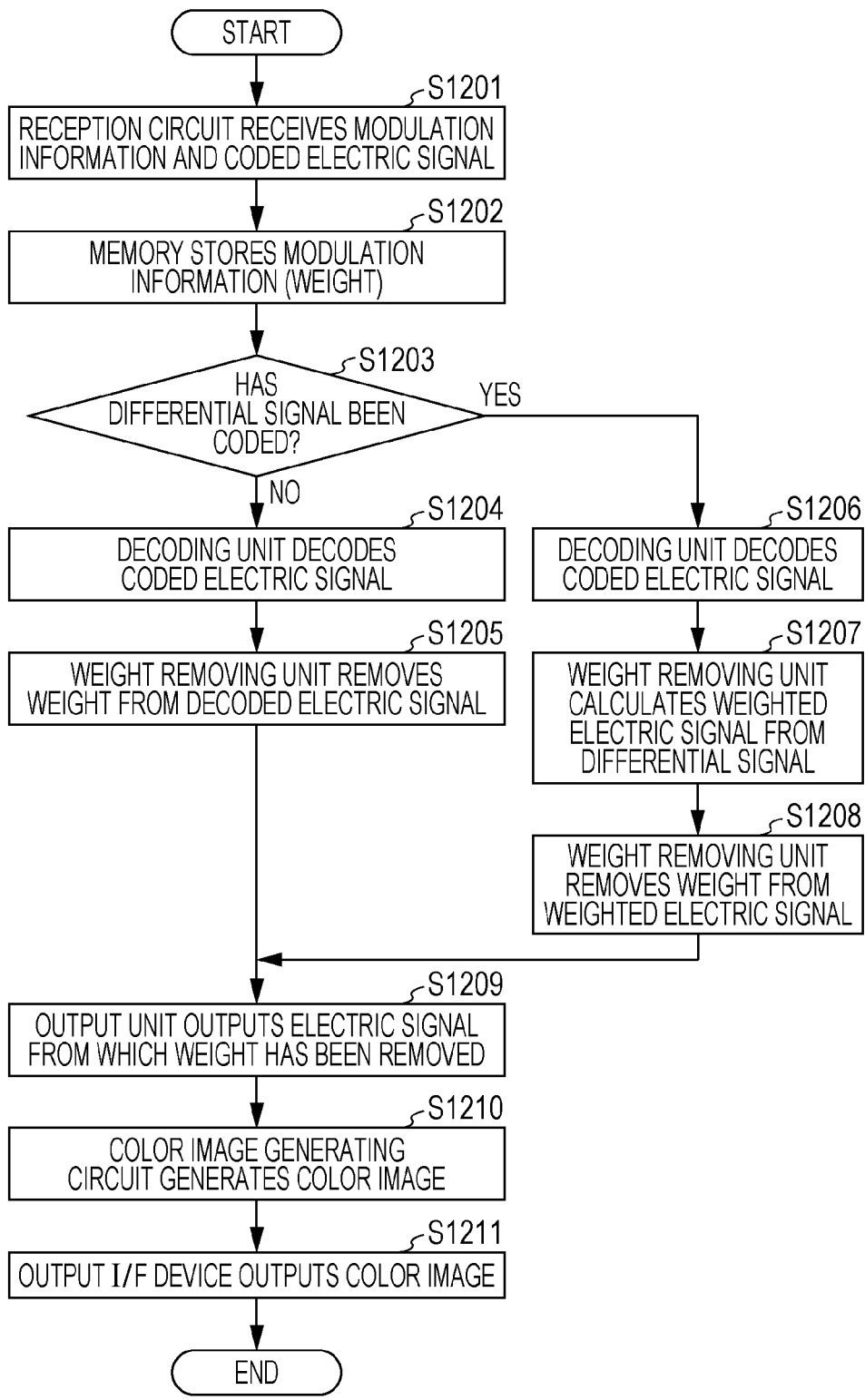
FIG. 12 is a flowchart illustrating processing of decoding an electric signal in the image generating apparatus used in the imaging system according to the first embodiment of the present disclosure.

The decoding and the removal of the weight described above will be described later in further detail (FIG. 12).

The output unit 207 transmits the electric signal from which the weight has been removed, or in other words, the modulation image to the color image generating circuit 203.

Color Image Generating Circuit 203

In FIG. 7, the color image generating circuit 203 generates a color image on the basis of the modulation image acquired from the received data decoding circuit 202. In addition, the color image generating circuit 203 transmits the generated color image to the output interface device 204. The color image generating circuit 203 will be described later in further detail.

Output Interface Device 204

The output interface device 204 is a video output terminal. The output interface device 204 outputs the color image in the form of a digital signal or an analog signal to the outside of the image generating apparatus 2.

Hereinafter, the operation of the imaging system that includes the imaging apparatus 1 and the image generating apparatus 2 configured as described above according to the first embodiment of the present disclosure will be described.

Figure 8:
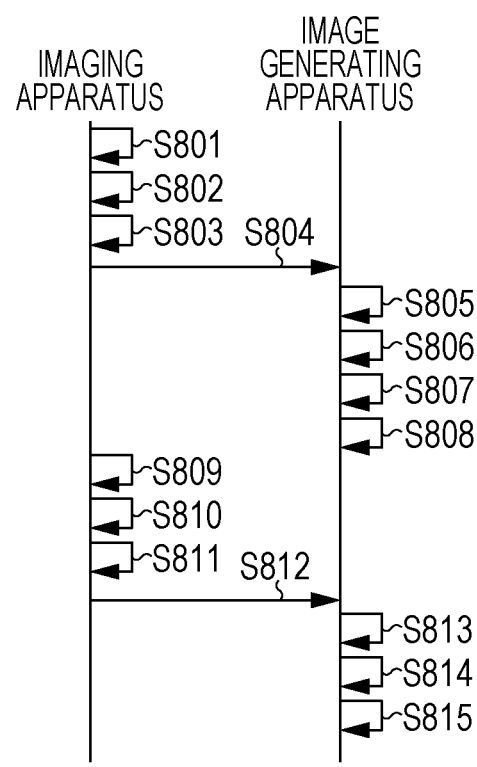
FIG. 8 is a sequence diagram illustrating processing between the imaging apparatus and the image generating apparatus according to the first embodiment of the present disclosure.

FIG. 8 is a sequence diagram illustrating a processing sequence between the imaging apparatus 1 and the image generating apparatus 2 according to an embodiment of the present disclosure.

Figure 9:
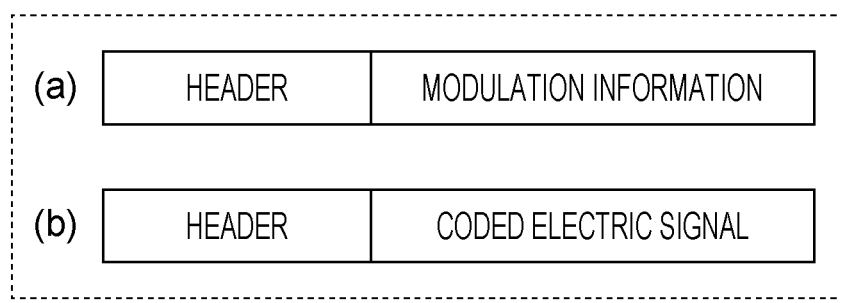
FIG. 9 is a schematic diagram illustrating an exemplary transmission format for transmitting modulation information and a coded electric signal.

FIG. 9 is a schematic diagram illustrating exemplary transmission formats for transmitting modulation information and a coded electric signal. FIG. 9(a) is a schematic diagram illustrating an exemplary transmission format in which the modulation information is written. In addition, FIG. 9(b) is a schematic diagram illustrating an exemplary transmission format in which the coded electric signal is written.

First, the imaging device 103 of the imaging apparatus 1 receives light converged by the optical imaging system 101 at each of the plurality of pixels, and converts the received light to an electric signal (S801).

The transmission data compressing circuit 104 of the imaging apparatus 1 weights the electric signal by using the modulation information acquired from the memory 107 (S802).

The transmission data compressing circuit 104 of the imaging apparatus 1 codes the weighted electric signal (S803).

The transmission circuit 105 of the imaging apparatus 1 transmits the modulation information to the image generating apparatus 2 by using the transmission format illustrated in FIG. 9(a) and transmits the coded electric signal to the image generating apparatus 2 by using the transmission format illustrated in FIG. 9(b) in a first instance of communication connected to the image generating apparatus 2 (S804). Here, instead of transmitting the modulation information, the imaging apparatus 1 may transmit specification information that specifies the modulation information. In this case, if the image generating apparatus 2 stores the modulation information in advance, the imaging apparatus 1 can specify the modulation information corresponding to the imaging apparatus 1.

The reception circuit 201 of the image generating apparatus 2 receives the modulation information and the coded electric signal transmitted from the transmission circuit 105 (S805).

The memory 205 of the image generating apparatus 2 stores the modulation information (S806). As described above, in a case in which the transmission circuit 105 has transmitted the specification information, the memory 205 of the image generating apparatus 2 stores the specification information (S806).

The decoding unit 208 of the image generating apparatus 2 decodes the coded electric signal (S807). It is to be noted that S807 may be carried out concurrently with S806 or may be carried out prior to S806.

The weight removing unit 209 of the image generating apparatus 2 removes the weight from the decoded electric signal by using the modulation information acquired from the memory 205 (S808).

In addition, in a similar manner to S801, S802, and S803, the imaging apparatus 1 converts light converged by the optical imaging system 101 to an electric signal (S809), weights the electric signal by using the modulation information (S810), and codes the weighted electric signal (S811).

Here, in a second instance of communication connected to the image generating apparatus 2, the transmission circuit 105 of the imaging apparatus 1 does not output the modulation information and only transmits the coded electric signal to the image generating apparatus 2 by using the transmission format illustrated in FIG. 9(b) (S812). The modulation information is a fixed value unique in the imaging apparatus 1. Therefore, the transmission circuit 105 does not need to transmit the modulation information to the image generating apparatus 2 every time in the second and subsequent instances of communication connected to the image generating apparatus 2. In a similar manner, in a case in which the transmission circuit 105 has transmitted the specification information in the first instance of communication connected to the image generating apparatus 2, the transmission circuit 105 does not need to transmit the specification information to the image generating apparatus 2 every time in the second and subsequent instances of communication connected to the image generating apparatus 2.

Next, the image generating apparatus 2 receives the coded electric signal transmitted from the transmission circuit 105 (S813). Here, unlike S805, the image generating apparatus 2 does not receive the modulation information. This is because the modulation information has been stored in the memory 205 of the image generating apparatus 2 in S806. Subsequently, the coded electric signal is decoded (S814), and the weight is removed from the decoded electric signal by using the modulation information acquired from the memory 205 (S815).

Next, with reference to FIGS. 10 and 11, the operation of the transmission data compressing circuit 104 will be described in further detail. FIG. 10 is a flowchart illustrating the processing of coding an electric signal in the imaging apparatus 1 according to the first embodiment of the present disclosure.

In FIG. 10, first, the input unit of the transmission data compressing circuit 104 acquires an electric signal acquired by the imaging device 103 (S1001).

The weighting unit 109 of the transmission data compressing circuit 104 acquires the modulation information from the memory 107 (S1002). As described above, the modulation information is information that indicates the reciprocal of the proportion of the overall light transmission rate characteristic of the filter unit 102 corresponding to each pixel relative to the wavelength characteristic that is common among the pixels, or in other words, the "weight." To be more specific, the modulation information is a value calculated as a reciprocal of a multiply-accumulate operation of the overall light transmission rate characteristic $x(\lambda, u, v)$ of the filter unit 102 at the pixel position $(u,v)$ and the wavelength characteristic that is common among the pixels. When the wavelength characteristic that is common among the pixels is represented by $T(\lambda)$, the modulation information $w(u,v)$ can be calculated through the following expression (2).

$$w(u,v)=1/(\int x(\lambda,u,v) \cdot T(\lambda) d\lambda) \tag{2}$$

Here, a case in which the overall light transmission rate characteristic $x(\lambda, u,v)$ of the filter unit 102 is expressed by a linear sum of red (R), green (G), and blue (B) serving as the light transmission rate characteristic of a second group. Here, "red (R), green (G), and blue (B) serving as the light transmission rate characteristic" may mean "the virtually determined light transmission rate of red light, the virtually determined light transmission rate of green light, and the virtually determined light transmission rate of blue light." The degree of contribution of the light transmission rate characteristic corresponding to the wavelength band of R in the entire filter unit 102 corresponding to the pixel $(u,v)$ is represented by $TR(u,v)$, the degree of contribution of the light transmission rate characteristic corresponding to the wavelength band of G in the entire filter unit 102 corresponding to the pixel $(u,v)$ is represented by $TG(u,v)$, and the degree of contribution of the light transmission rate characteristic corresponding to the wavelength band of B in the entire filter unit 102 corresponding to the pixel $(u,v)$ is represented by $TB(u,v)$. Then, the above expression (2) can be expressed by the following expression (3).

$$w(u,v)=1/(\alpha_R \cdot TR(u,v)+\alpha_G \cdot TG(u,v)+\alpha_B \cdot TB(u,v)).$$

$$TR(u,v)=\int x(\lambda,u,v) \cdot R(\lambda) d\lambda.$$

$$TG(u,v)=\int x(\lambda,u,v) \cdot G(\lambda) d\lambda.$$

$$TB(u,v)=\int x(\lambda,u,v) \cdot B(\lambda) d\lambda \tag{3}$$

In the above, $R(\lambda)$ represents the light transmission rate characteristic of red light, $G(\lambda)$ represents the light transmission rate characteristic of green light, and $B(\lambda)$ represents the light transmission rate characteristic of blue light. $R(\lambda)$, $G(\lambda)$, and $B(\lambda)$ may each be determined virtually by a developer who develops this apparatus, method, or system. For example, the following settings may be employed.

$R(\lambda)$=light transmission rate of 1(610 nm≤λ≤650 nm), light transmission rate of 0(λ<610 nm, λ>650 nm)
$G(\lambda)$=light transmission rate of 1(500 nm≤λ≤560 nm), light transmission rate of 0(λ<500 nm, λ>560 nm)
$B(\lambda)$=light transmission rate of 1(450 nm≤λ≤480 nm), light transmission rate of 0(λ<450 nm, λ>480 nm)

In addition, $\alpha_R$, $\alpha_G$, and $\alpha_B$ are constants determined in accordance with the type of the wavelength characteristic that is common among the pixels. For example, when the wavelength characteristic that is common among the pixels is such that the light transmission rate is the same in all the wavelength bands corresponding to red (R), green (G), and blue (B), $\alpha_R$, $\alpha_G$, and $\alpha_B$ take the values indicated in the following expression (4).

$$\alpha_R=0.3333.$$

$$\alpha_G=0.3333.$$

$$\alpha_B=0.3333 \tag{4}$$

In this case, the modulation information $w(u,v)$ takes a value obtained by plugging the coefficients indicated in the expression (4) into the expression (3).

In addition, when the wavelength characteristic that is common among the pixels is the wavelength characteristic that indicates the spectral luminous efficiency, $\alpha_R$, $\alpha_G$, and $\alpha_B$ take the values indicated in the following expression (5).

$$\alpha_R=0.2126.$$

$$\alpha_G=0.7152.$$

$$\alpha_B=0.0722 \tag{5}$$

In this case, the modulation information $w(u,v)$ takes a value obtained by plugging the coefficients indicated in the expression (5) into the expression (3).

In addition, when the wavelength characteristic that is common among the pixels is such that the light transmission rate is 0 in the wavelength bands corresponding to red (R) and blue (B) and the light transmission rate exceeds 0 only in the wavelength band corresponding to green (G), $\alpha_R$, $\alpha_G$, and $\alpha_B$ take the values indicated in the following expression (6).

$$\alpha_R=0$$

$$\alpha_G=1$$

$$\alpha_B=0 \tag{6}$$

In this case, the modulation information w(u,v) takes a value obtained by plugging the coefficients indicated in the expression (6) into the expression (3).

In addition, when the wavelength characteristic that is common among the pixels indicates the differential characteristic between the red characteristic and the blue characteristic common among the pixels, $\alpha_R$, $\alpha_G$, and $\alpha_B$ take the values indicated in the following expression (7).

$$\alpha_R = -1$$

$$\alpha_G = 0$$

$$\alpha_B = 1 \quad (7)$$

In this case, the modulation information w(u,v) takes a value obtained by plugging the coefficients indicated in the expression (7) into the expression (3).

Subsequently, the processing proceeds to S1003. In S1003, the weighting unit 109 of the transmission data compressing circuit 104 weights the electric signal by using the modulation information w(u,v) obtained as described above. When the electric signal corresponding to the pixel (u,v) is represented by y(u,v), the weighted electric signal d(u,v) corresponding to the pixel (u,v) is expressed by the following expression (8).

$$d(u,v) = w(u,v) \cdot y(u,v) \quad (8)$$

Here, S1003 corresponds to the second phase in the present embodiment. In this manner, the weighted electric signal d(u,v) obtained by weighting the value y(u,v) of the electric signal corresponding to each pixel by using the modulation information w(u,v) is approximated to an electric signal obtained by using a color filter having the wavelength characteristic T(λ) that is common among the pixels.

In other words, by calculating the modulation information w(u,v) first, the individual characteristic of the pixel represented by the overall light transmission rate characteristic x(λ, u,v) of the filter unit 102 corresponding to each pixel can be grasped relatively in terms of its relationship to the characteristic common among the pixels represented by the wavelength characteristic T(λ) that is common among the pixels. Here, the sum of products of the overall light transmission rate characteristic x(λ, u,v) of the filter unit 102 corresponding to the pixel position (u,v) and the wavelength characteristic that is common among the pixels, which corresponds to the denominator of the right-hand side of the expression (2), indicates the proportion occupied by the overall light transmission rate characteristic x(λ, u,v) of the filter unit 102 corresponding to each pixel with respect to the wavelength characteristic T(λ) that is common among the pixels. As indicated by the expression (2), the modulation information w(u,v) is the reciprocal of the stated proportion. Therefore, the modulation information w(u,v) indicates the proportion occupied by the wavelength characteristic T(λ) that is common among the pixels with respect to the overall light transmission rate characteristic x(λ, u,v) of the filter unit 102 corresponding to each pixel.

Thus, as indicated in the expression (8), by multiplying the electric signal y(u,v) acquired with the overall light transmission rate characteristic x(λ, u,v) of the filter unit 102 corresponding to each pixel serving as a reference by the modulation information w(u,v), or in other words, by weighting the electric signal y(u,v) with the modulation information w(u,v), the electric signal y(u,v) acquired with the individual characteristic x(λ, u,v,) of each pixel serving as a reference can be converted to the value d(u,v) that is based on the characteristic common among the pixels represented by the wavelength characteristic T(λ) that is common among the pixels. In this manner, the weighted electric signal d(u,v) corresponding to each pixel takes a value that is based on the wavelength characteristic T(λ) that is common among the pixels. Thus, the compressibility comparable to that of the conventional technique that calculates the difference in the electric signal between pixels with the same light transmission rate characteristic and enhances the compressibility can be achieved.

With this, even in a case in which the electric signal is acquired with the use of the filter unit 102 of which the light transmission rate characteristic is made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

Next, the coding unit 110 of the transmission data compressing circuit 104 successively codes the weighted electric signal corresponding to each pixel in accordance with the raster scan order (S1004 to S1007).

Here, the raster scan will be described with reference to FIG. 11. FIG. 11 is a schematic diagram illustrating a raster scan order used to describe the processing of coding the weighted electric signal. In FIG. 11, the number N of the pixels in the imaging device 103 is set to 16 for simplifying the description. First, at v=1 in FIG. 11, the pixels are selected one by one sequentially starting from the pixel (u,v)=(1,1) on the left end to the pixel (u,v)=(4,1) on the right end. Then, in a similar manner at v=2, the pixels are selected one by one sequentially starting from the pixel (u,v)=(1,2) on the left end to the pixel (u,v)=(4,2) on the right end. In addition, in a similar manner at v=3 and subsequently at v=4, the pixels are selected one by one sequentially starting from the pixel on the left end to the pixel on the right end. Thus, the last pixel to be selected is the pixel (u,v)=(4,4). In such an order, the coding unit 110 of the transmission data compressing circuit 104 successively codes the weighted electric signal corresponding to each pixel.

Returning to S1004, the coding unit 110 of the transmission data compressing circuit 104 first determines whether a neighboring pixel is present with respect to a pixel of interest in order to select a method of compressing the weighted electric signal. Here, the "neighboring pixel" is a pixel that is to the left of the pixel of interest. For example, in FIG. 11, the pixels (u,v)=(1,1), (1,2), (1,3), and (1,4) on the left end do not have a neighboring pixel. Meanwhile, the pixels other than these pixels have a neighboring pixel.

If no neighboring pixel is present with respect to the pixel of interest (in the case of "No" in S1004), or in other words, if the pixel of interest is a pixel on the left end of the imaging device 103, the coding unit 110 of the transmission data compressing circuit 104 codes the weighted electric signal corresponding to the pixel of interest (S1005). The coding may be carried out through entropy coding or Huffman coding.

On the other hand, if there is a neighboring pixel with respect to the pixel of interest (in the case of "Yes" in S1004), the coding unit 110 of the transmission data compressing circuit 104 calculates the difference between the weighted electric signal corresponding to the pixel of interest and the weighted electric signal corresponding to the neighboring pixel (hereinafter, referred to as a "differential signal") (S1006). In S1006, the differential signal d(u,v) is calculated, for example, in the following manner.

$$d(u,v)=w(u,v)\cdot y(u,v)-d(u-1,v) \qquad (9)$$

The coding unit 110 codes the differential signal (S1007). The coding may be carried out through entropy coding or Huffman coding. Hereinafter, the coded differential signal may also be referred to as a coded electric signal.

The transmission data compressing circuit 104 transmits the modulation information and the coded electric signal to the image generating apparatus 2 via the transmission circuit 105 (S1008).

As described above, according to the imaging apparatus 1 of the first embodiment, even in a case in which the electric signal is acquired with the use of the filter unit 102 of which the light transmission rate characteristic is made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

Next, with reference to FIG. 12, the operation of the image generating apparatus 2 will be described in further detail.

FIG. 12 is a flowchart illustrating processing of decoding an electric signal in the image generating apparatus 2 used in the imaging system according to the first embodiment of the present disclosure.

The reception circuit 201 of the image generating apparatus 2 receives the modulation information and the coded electric signal transmitted from the transmission circuit 105 (S1201). The reception is carried out via a wireless or wired communication circuit (network).

The memory 205 of the image generating apparatus 2 stores the modulation information (S1202).

The decoding unit 208 of the image generating apparatus 2 determines whether the coded electric signal is a signal obtained by coding the weighted electric signal or a signal obtained by coding the differential signal (S1203). This determination can be made by determining whether the pixel of interest corresponds to a pixel (u=1) on the left end of the imaging device 103.

If the coded electric signal is not a signal obtained by coding the differential signal (in the case of "No" in S1203), the decoding unit 208 of the image generating apparatus 2 decodes the coded electric signal (S1204). S1204 corresponds to the third phase in the present embodiment. The decoded electric signal is the weighted electric signal d(u,v) indicated in the expression (8). Therefore, the decoded electric signal d(u,v) corresponds to the weighted electric signal, or in other words, corresponds to a value approximated to an electric signal obtained by using a color filter having the wavelength characteristic that is common among the pixels. Thus, the reproducibility of the color image cannot be increased yet at this point.

Therefore, the weight removing unit 209 of the image generating apparatus 2 removes the weight from the decoded electric signal (S1205). This is calculated through the following expression (10). S1205 corresponds to the fourth phase in the present embodiment. In the fourth phase, the weight removing unit 209 removes the weight from the decoded electric signal d(u,v) by using the modulation information w(u,v) stored in the memory 205 in S1202. With this, a value held after the light from the object 111 is transmitted through the filter unit 102 can be obtained.

$$y(u,v)=d(u,v)/w(u,v) \qquad (10)$$

Meanwhile, if the coded electric signal is a signal obtained by coding the differential signal (in the case of "Yes" in S1203), the decoding unit 208 of the image generating apparatus 2 decodes the coded electric signal (S1206). S1206 corresponds to the third phase in the present embodiment. The decoded electric signal is the differential signal d(u,v) indicated in the expression (9). Therefore, the decoded electric signal specifically corresponds to the difference between the values approximated to the electric signals obtained by using a color filter having the wavelength characteristic that is common among the pixels. Therefore, the reproducibility of the color image cannot be increased yet at this point. Thus, thereafter, the weight removing unit 209 of the image generating apparatus 2 carries out the processing in S1207 and S1208.

The weight removing unit 209 of the image generating apparatus 2 calculates the weighted electric signal from the decoded electric signal, or in other words, from the differential signal (S1207). This is calculated through the following expression (11).

$$w(u,v)\cdot y(u,v)=d(u,v)+d(u-1,v) \qquad (11)$$

The weight removing unit 209 of the image generating apparatus 2 removes the weight from the weighted electric signal (S1208). This is calculated through the following expression (12). S1208 corresponds to the fourth phase. In the fourth phase, the weight removing unit 209 removes the weight from the decoded electric signal d(u,v) by using the modulation information w(u,v) stored in the memory 205 in S1202. With this, a value held after the light from the object 111 is transmitted through the filter unit 102 can be obtained.

$$y(u,v)=(d(u,v)+d(u-1,v))/w(u,v) \qquad (12)$$

The output unit 207 of the image generating apparatus 2 outputs the electric signal from which the weight has been removed, or in other words, outputs the modulation image to the color image generating circuit 203 of the image generating apparatus 2 (S1209).

As described above, as long as the modulation information w(u,v) has been obtained in the image generating apparatus 2 to which the coded electric signal is input from the imaging apparatus 1, the decoded electric signal can be restored to the original unweighted electric signal y(u,v). In this manner, even in a case in which the image generating apparatus 2 acquires, from the imaging apparatus 1, the electric signal with the use of the filter unit 102 of which the light transmission rate characteristic is made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

The original unweighted electric signal y(u,v) obtained through the processing up to S1209 described above, or in other words, the modulation image is a monochrome image.

Next, the color image generating circuit 203 generates a color image from the modulation image, which is a monochrome image (S1210). Here, the amount of information in a color image composed of three pieces of wavelength information on red (R), green (G), and blue (B) is three times the amount of information in a monochrome image. The color image generating circuit 203 generates a color image from a small amount of information by using a compressed sensing technique.

The processing of generating a color image can be formulated as in the following expression (13), in which y represents the modulation image and x represents the color image to be generated.

$$y = Ax \quad (13)$$

In the above, the matrix A is a sampling matrix determined by the light transmission rate characteristic at each wavelength of the entire filter unit 102 corresponding to each pixel. The sampling matrix A indicates the relationship between the modulation image y and the color image x to be generated. Here, the color image x to be generated has a plurality of specific wavelength characteristics. When focusing on this point, the expression (13) indicates that the overall light transmission rate characteristic of the filter unit 102 is expressed by the linear sum of the plurality of specific light transmission rate characteristics. In addition, the filter unit 102 as a whole has a light transmission rate characteristic that varies randomly in different pixels, and thus each element in the matrix A differs randomly. In other words, the matrix A is a random projection with respect to the color image x to be generated. The random projection is a sampling method with high reconstruction performance in compressed sensing. Since the color image generating circuit 203 uses the compressed sensing technique, the use of such a filter unit 102 can increase the reproducibility of a color image.

Hereinafter, the method of acquiring the sampling matrix A will be described. Here, a technique that uses color calibration with the Macbeth ColorChecker will be described. The Macbeth ColorChecker consists of a set of 24 color samples based on the Munsell color system. In the Macbeth ColorChecker, the XYZ value or the sRGB value of each color sample is defined.

Here, the optical intensity of light received at a given pixel i (i=1, 2, 3, . . . , N) is represented by l(j, i) (j= 1, 2, 3, . . . , 24), and the sRGB value of each color sample is represented by R'(j), G'(j), B'(j) in an image of the 24 color samples j captured by the imaging apparatus 1 of the present embodiment. Then, the following relational expression (14) holds true.

$$c(1,i) \cdot R(j) + c(2,i) \cdot G(j) + c(3,i) \cdot B(j) = I(j,i), j=1,2, \ldots, 24 \quad (14)$$

In the above, c(x,i) (x=1, 2, 3) is an element at the ith row and the (3(i−1)+x)th column in the sampling matrix A. The elements other than the element at the ith row and the (3(i−1)+x)th column (i=1, 2, 3, . . . , N; j=1, 2, 3, . . . , 24) in the sampling matrix A are 0. In addition, R(j), G(j), and B(j) are obtained by converting R'(j), G'(j), and B'(j) linearly. Specifically, R(j), G(j), and B(j) are obtained through the following calculations.

$$R(j) = \{(R'(j)/255 + 0.055)/1.055\}^{2.4} \times 255,$$

$$G(j) = \{(G'(j)/255 + 0.055)/1.055\}^{2.4} \times 255,$$

$$B(j) = \{(B'(j)/255 + 0.055)/1.055\}^{2.4} \times 255 \quad (15)$$

The expression (15) can be solved by a least-squares method since the number of conditional equations is 24 with respect to three unknowns. By carrying out this processing on all of the pixels, the sampling matrix A can be acquired.

In order to simplify the description, the number N of the pixels in the imaging device 103 is assumed to be 16. FIG. 13 is a schematic diagram illustrating an exemplary modulation image and exemplary generated images when the number N of the pixels in an imaging device is set to 16. FIG. 13(a) is a schematic diagram illustrating an exemplary modulation image when the number N of the pixels in the imaging device is set to 16. FIG. 13(b) is a schematic diagram illustrating an exemplary generated R image, which is a red (R) channel in the generated color image, when the number N of the pixels in the imaging device is set to 16. FIG. 13(c) is a schematic diagram illustrating an exemplary generated G image, which is a green (G) channel in the generated color image, when the number N of the pixels in the imaging device is set to 16. FIG. 13(d) is a schematic diagram illustrating an exemplary generated B image, which is a blue (B) channel in the generated color image, when the number N of the pixels in the imaging device is set to 16. In the expression (13), y and x are expressed as follows.

$$y = [y_{1,1}, y_{2,1}, y_{3,1} \ldots y_{4,4}]^T.$$

$$x = [r_{1,1} g_{1,1} b_{1,1} r_{2,1} g_{2,1} b_{2,1} r_{3,1} g_{3,1} b_{3,1} \ldots r_{4,4} g_{4,4} b_{4,4}]^T \quad (16)$$

As can be seen clearly from the expression (16), the number of elements y to be observed is as small as 16 with respect to the number of elements x serving as unknowns being 48 in the expression (13). Therefore, the expression (13) is an ill-posed problem.

In order to solve this ill-posed problem, the color image generating circuit 203 uses the compressed sensing technique. The compressed sensing technique is a technique in which the amount of data is compressed by carrying out adding processing (coding) when sensing a signal and the original signal is decoded by carrying out decoding processing later by using the compressed data. The compressed sensing processing uses prior knowledge in order to solve an ill-posed problem. In the compressed sensing processing, as the prior knowledge on a natural image, total variation, which is the absolute value sum of the change in the luminance from the vicinity in an image (e.g., Rudin L. I., Osher S. J., and Fatemi E.: Nonlinear total variation based noise removal algorithms. Physica D, vol. 60, pp. 259-268, 1992; Shunsuke Ono, Isao Yamada, "Decorrelated Vectorial Total Variation," IEEE Conference on Computer Vision and Pattern Recognition, 2014), sparsity that most of the coefficients become 0 in a linear transformation, such as wavelet transform, discrete-cosine transform (DCT), or curvelet transform (e.g., J. Ma, "Improved Iterative Curvelet Thresholding for Compressed Sensing and Measurement," IEEE Transactions on Instrumentation & Measurement, vol. 60, No. 1, pp. 126-136, 2011), dictionary learning of acquiring the conversion factor in the aforementioned linear transformation through learning (e.g., M. Aharon, M. Elad, and A. M. Bruckstein, "K-SVD: An Algorithm for Designing Overcomplete Dictionaries for Sparse Representation," IEEE Transactions on Image Processing, vol. 54, No. 11, pp. 4311-4322, 2006), or the like can be used.

Here, decorrelated vectorial total variation, which is a technique classified as a type of total variation, will be described. This technique suppresses an occurrence of a false color through a calculation in which the gradient of the luminance component and the gradient of the color difference component of a color image are separated. This is achieved by minimizing the following evaluation function.

$$\arg\min_{x \in [0,255]^{3 \times N}} J(x) + \|Ax - y\|_2^2 \quad (17)$$

The evaluation function of the expression (17) consists of the following three terms.
1. data fidelity term $\|Ax-y\|^2_2$: constraint term for satisfying the expression (13)
2. dynamic range term: (x is $[0.255]^{3 \times N}$): constraint term for that the pixel value is no less than 0 nor more than 255
3. decorrelated vectorial total variation term J(x): total variation term in which the gradient of the luminance component and the gradient of the color difference component in a color image are separated Here, the following expression (18) holds true.

$$J: R^{3N} \to R_+ : \mapsto \|DCx\|_{1,2}^{(w,2,4)} \quad (18)$$

In the above, $$x = [x_R^T x_G^T x_B^T]^T \in R^{3N},$$

C is the orthogonal color conversion: $R^{3N} \to R^{3N}: x \mapsto [x_1 x_2 x_3]$, $$x_1 = \frac{1}{\sqrt{3}}(x_R + x_G + x_B), x_2 = \frac{1}{\sqrt{2}}(x_R - x_B), x_3 = \frac{1}{\sqrt{6}}(x_R - 2x_G + x_B),$$

$D = \text{diag}(D_1 D_1 D_1) \in R^{6N \times 3N}$ is a primary gradient operator in the color image, boundary),
$D_1 = [D_v^T D_h^T]^T \in R^{2N \times N}$ is a primary gradient operator of each channel,
$D_v, D_h \in R^{N \times N}$ is a vertical/horizontal primary gradient operator (Neumann boundary), $$\|\cdot\|_{1,2}^{(w,k_1,k_2)}: R^{(k_1+k_2)N} \to R_+ : x \mapsto w\|x_1\|_{1,2}^{(k_1)} + \|x_2\|_{1,2}^{(k_2)},$$

$$\|\cdot\|_{1,2}^{(k)}: R^{kN} \to R_+ : x \mapsto = \sum_{i=1}^{N} \sqrt{\sum_{j=0}^{k-1} x_{i+jN}^2},$$

$x_i$ is an ith element of x, $x = [x_1^T x_2^T]^T$, $x_1 \in R^{k_1 N}$, $x_2 \in R^{k_2 N}$, $w \in (0,1)$.
R is a real number, and R+ is a nonnegative real number.

In the manner described above, the color image generating circuit 203 generates a color image from the modulation image.

The output interface (I/F) device 204 of the image generating apparatus 2 outputs the color image generated by the color image generating circuit 203 to the outside of the image generating apparatus 2, for example, to a display (S1211).

Lastly, a sample of a color image generated by the imaging system according to the first embodiment of the present disclosure will be illustrated.

Figure 14:
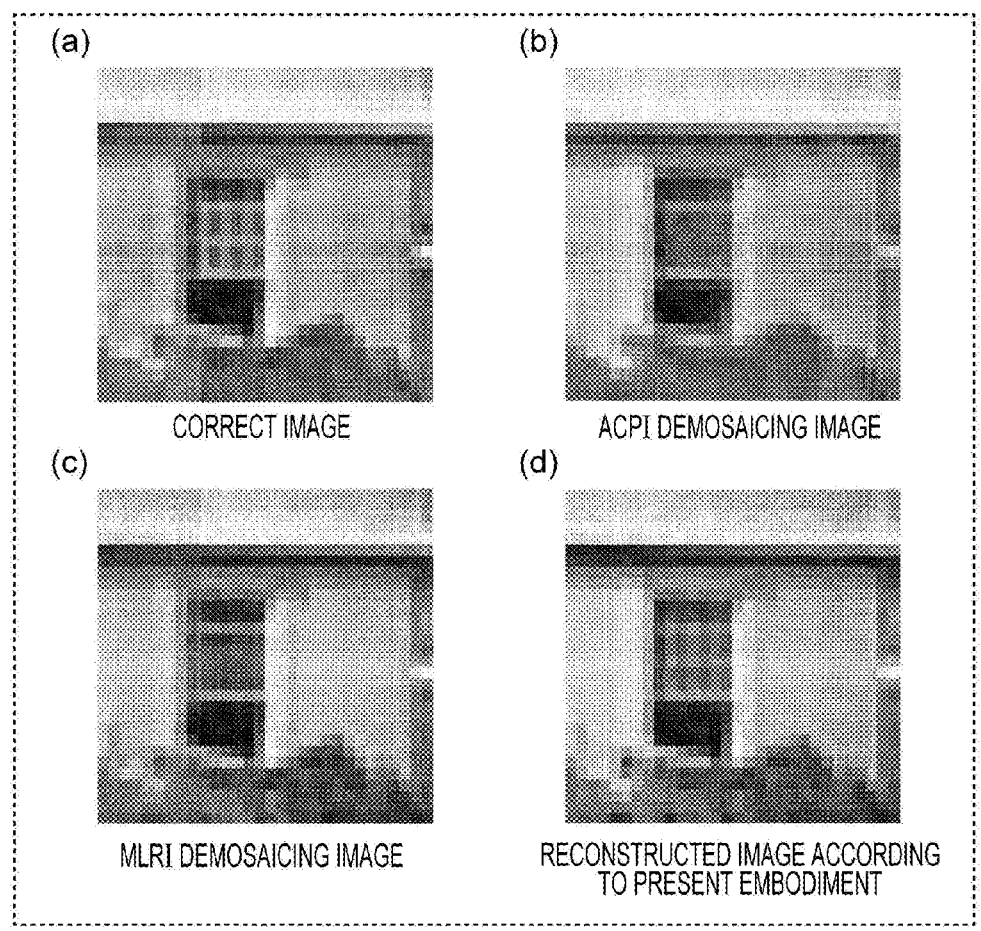
FIG. 14 illustrates an example of an R channel image generated by a color image generating circuit used in the imaging system according to the first embodiment of the present disclosure.
Figure 15:
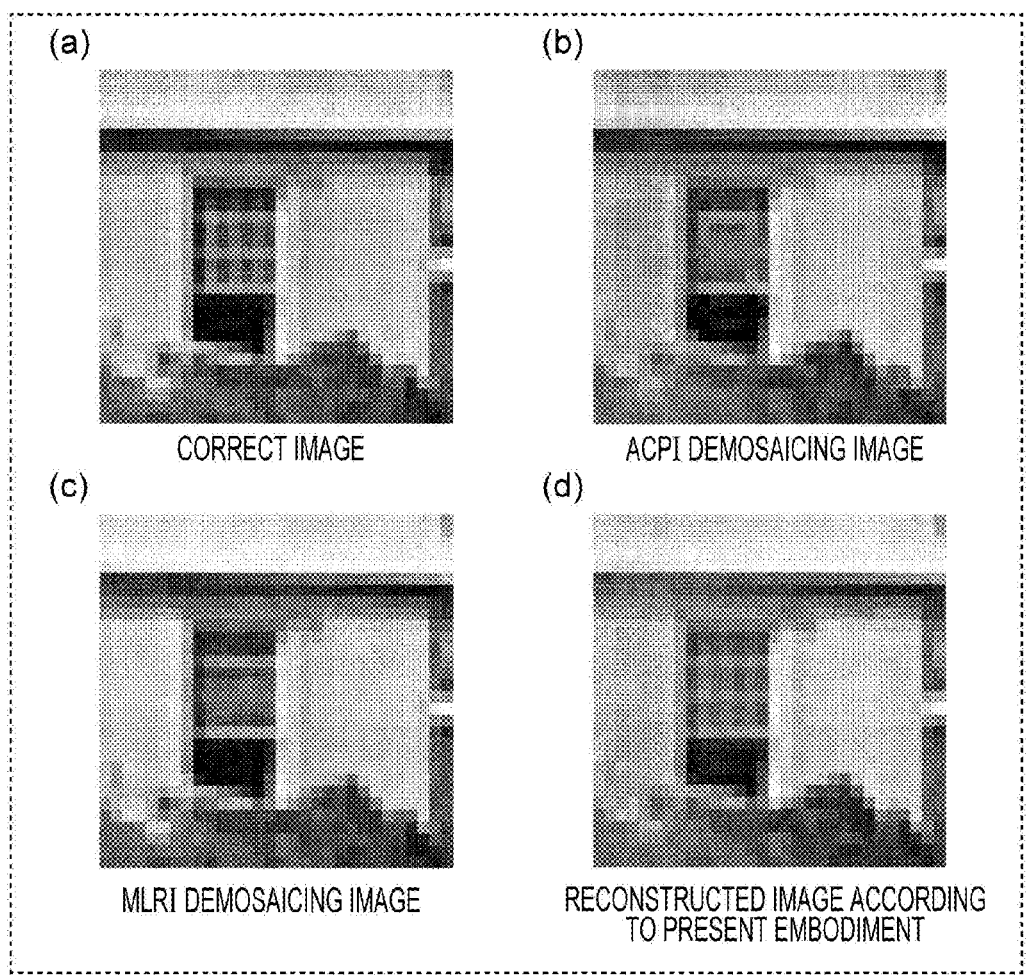
FIG. 15 illustrates an example of a G channel image generated by the color image generating circuit used in the imaging system according to the first embodiment of the present disclosure.
Figure 16:
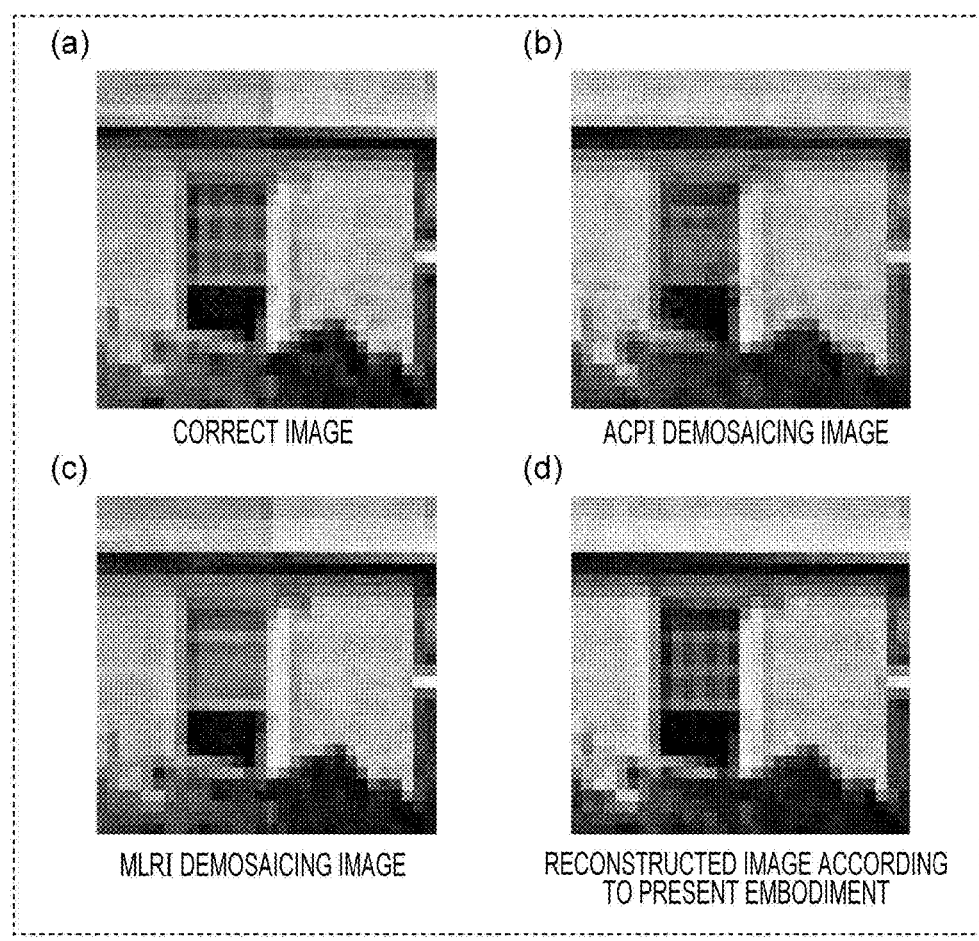
FIG. 16 illustrates an example of a B channel image generated by the color image generating circuit used in the imaging system according to the first embodiment of the present disclosure.

FIGS. 14 through 16 illustrate examples of color images of the respective colors generated by the color image generating circuit 203 used in the imaging system according to the first embodiment of the present disclosure. The inventor of the present application actually generated and compared color images, and the images illustrated in FIGS. 14 through 16 are depicted by using the luminance values.

FIG. 14 illustrates examples of R channel images generated by the color image generating circuit 203 used in the imaging system according to the first embodiment of the present disclosure. FIG. 15 illustrates examples of G channel images generated by the color image generating circuit 203 used in the imaging system according to the first embodiment of the present disclosure. FIG. 16 illustrates examples of B channel images generated by the color image generating circuit 203 used in the imaging system according to the first embodiment of the present disclosure. In each of FIGS. 14 through 16, (a) is a correct color image captured by a three chips camera, (b) is a demosaicing image obtained through the adaptive color plane interpolation method (ACPI method) described in U.S. Pat. No. 5,629,734, which is a typical demosaicing technique, (c) is a demosaicing image obtained through the minimized-laplacian residual interpolation method (MLRI method) described in D. Kiku, Y. Monno, M. Tanaka and M. Okutomi, "Minimized-Laplacian residual interpolation for color image demosaicing," IS&T/SPIE Electronic Imaging (EI), 2014, and (d) is a reconstructed image generated by the color image generating circuit 203 used in the imaging system according to the first embodiment.

Hereinafter, the description will be given with reference to FIG. 14 serving as an example, and similar descriptions are applicable to FIGS. 15 and 16 as well.

A window having a lattice pattern is illustrated at the center portion of the image illustrated in FIG. 14(a). Each of the images illustrated in FIGS. 14(b) and 14(c) is an image captured by using a color filter of a conventional Bayer array illustrated in FIG. 20. The present inventor has verified and confirmed that a false color is present in the vicinity of an edge in the demosaicing image obtained through ACPI illustrated in FIG. 14(b). Specifically, the present inventor has confirmed that the false color is actually present at an edge portion of the window. The present inventor has also confirmed that such a false color is not present in the reconstructed image according to the present embodiment illustrated in FIG. 14(d).

In addition, in the demosaicing image obtained through the MLRI method illustrated in FIG. 14(c), a high-frequency component corresponding to the lattice pattern or the like of the window is not being reconstructed. Meanwhile, it can be seen that, in the reconstructed image according to the present embodiment illustrated in FIG. 14(d), as compared to the conventional technique, no false color has appeared and even the high-frequency component has been reconstructed.

Figure 17:
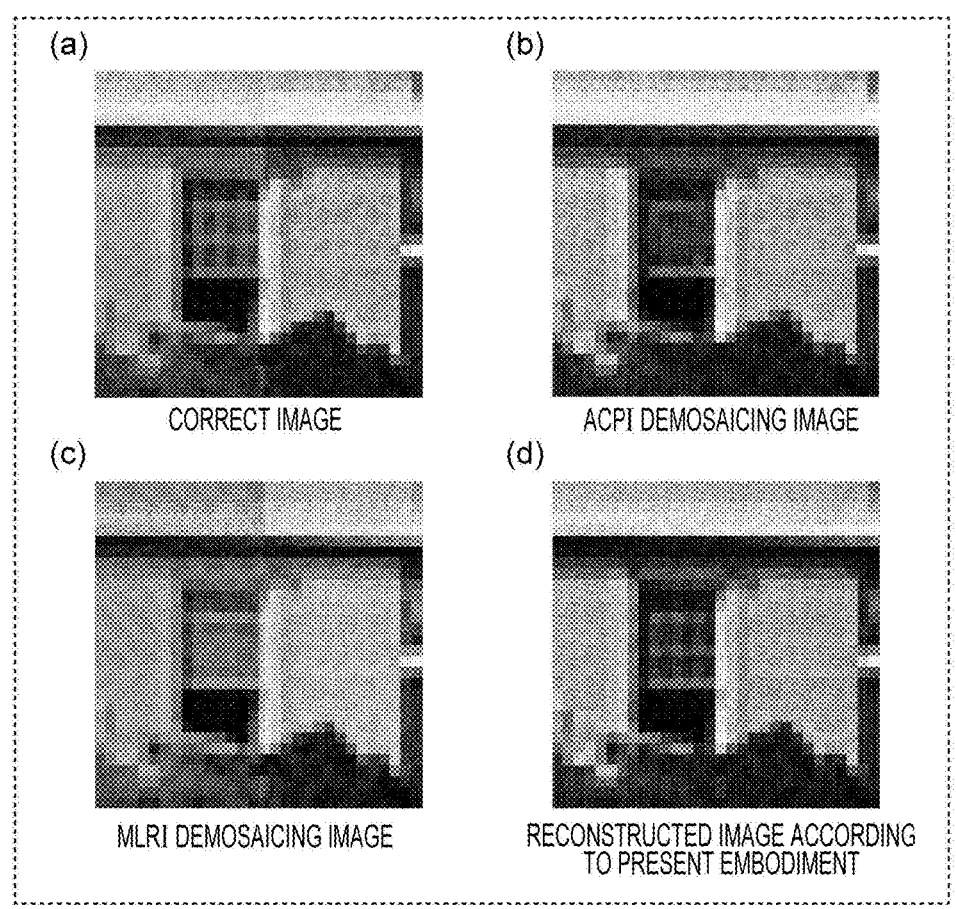
FIG. 17 illustrates an example of a color image generated by the color image generating circuit used in the imaging system according to the first embodiment of the present disclosure.

FIG. 17 illustrates examples of the color images that include all the colors. FIG. 17 is depicted by using the luminance values of the color image. As can be seen clearly by glancing at the lattice pattern of the window, the reconstructed image according to the present embodiment can be said to be the closest to the correct image.

Second Embodiment

Figure 18:
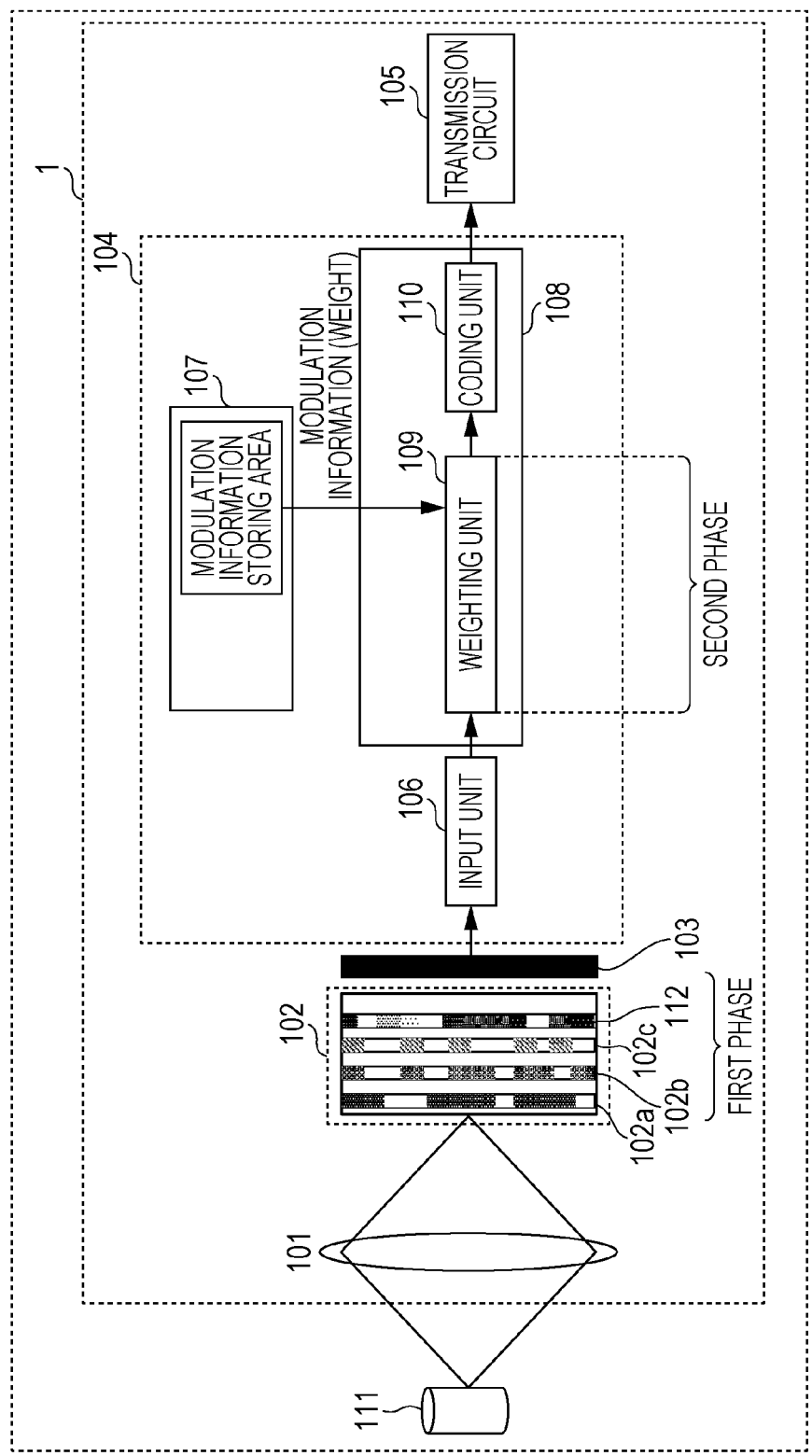
FIG. 18 is a schematic block diagram illustrating an imaging apparatus provided with a spatial light modulator in addition to a plurality of color filters that include an area having a thickness of 0 mm according to a second embodiment of the present disclosure.

Next, a second embodiment will be described with reference to FIG. 18. FIG. 18 is a schematic block diagram illustrating an imaging apparatus 1 according to the second embodiment of the present disclosure. In the imaging apparatus 1 according to the second embodiment, unlike the first embodiment, a filter unit 102 includes a plurality of color filters (102a through 102c) having an area with a thickness of 0 mm and a spatial light modulator 112. Here, the spatial light modulator 112 is an optical element that modulates the light transmission rate characteristic spatially and temporally. The light transmission rate characteristic of the spatial light modulator 112 can be made to differ randomly in different pixels of the imaging device 103. It is to be noted that, in FIG. 18, the constituent elements that are identical to those in FIG. 2 are given identical reference characters, and descriptions thereof will be omitted.

As illustrated in FIG. 18, the spatial light modulator 112 that modulates the lightness of the light transmitted through the plurality of color filters (102a through 102c) is provided between the imaging device 103 and the plurality of color filters (102a through 102c). In addition, each of the color filters 102a through 102c is provided with a portion at which the thickness of the color filter is 0 mm so as to correspond to a given pixel of the imaging device 103. In addition, the thickness of each of the color filters 102a through 102c is constant except for the portion at which the thickness of the color filter is 0 mm.

Here, a function M that takes a value determined by whether or not the thickness of each color filter at a position corresponding to each pixel is 0 mm is defined as follows. At the position corresponding to the pixel (u,v), when the thickness of the color filter 102a is not 0 mm, M1(u,v)=1 holds true, and when the thickness of the color filter 102a is 0 mm, M1(u,v)=0 holds true. In a similar manner, at the position corresponding to the pixel (u,v), when the thickness of the color filter 102b is not 0 mm, M2(u,v)=1 holds true, and when the thickness of the color filter 102b is 0 mm, M2(u,v)=0 holds true. At the position corresponding to the pixel (u,v), when the thickness of the color filter 102c is not 0 mm, M3(u,v)=1 holds true, and when the thickness of the color filter 102c is 0 mm, M3(u,v)=0 holds true. Furthermore, the light transmission rate characteristic of the spatial light modulator 112 at the position corresponding to the pixel (u,v) is represented by S(u,v). In this case, the overall light transmission rate characteristic of the plurality of color filters (102a through 102c) and the spatial light modulator 112 at the position corresponding to the pixel position (u,v), or in other words, the overall light transmission rate characteristic x(λ, u,v) of the filter unit 102 is expressed by the following expression (19).

$$x(\lambda,u,v)=P(C1(\lambda),M1(u,v))\cdot P(C2(\lambda),M2(u,v))\cdot P(C3(\lambda),M3(u,v))\cdot S(u,v) \quad (19)$$

In the above, P is a function that determines the light transmission rate characteristic depending on whether or not the thickness of each color filter is 0 mm and is expressed by the following expression (20).

$$P(C, M) = \begin{cases} 1; & M = 0, \\ C; & M \neq 0. \end{cases} \quad (20)$$

As indicated by the expression (19) and the expression (20), even if the structure of the plurality of color filters (102a through 102c) is simplified by keeping the light transmission rate characteristics C1(λ), C2(λ), and C3(λ) of the plurality of color filters (102a through 102c) at each wavelength from depending on the pixel position, the overall light transmission rate characteristic x(λ, u,v) of the filter unit 102 can be made to differ randomly in different pixels of the imaging device 103 by interposing the spatial light modulator 112. Therefore, even in a case in which the number of patterns of the light transmission rate characteristics corresponding to each of the pixels is restricted by simplifying the structure of the plurality of color filters (102a through 102c), the use of the spatial light modulator 112 makes it possible to increase the number of patterns of the light transmission rate characteristics corresponding to each of the pixels. For example, as described above, by using three color filters, eight types of overall light transmission rate characteristics of the plurality of color filters (102a through 102c) can be created. By adding the spatial light modulator 112 thereto, the number of types can be increased over the stated eight types. As a result, even in a case in which the structure of the plurality of color filters (102a through 102c) is simplified, the reproduction quality of the reconstructed image can be improved.

Third Embodiment

Figure 19:
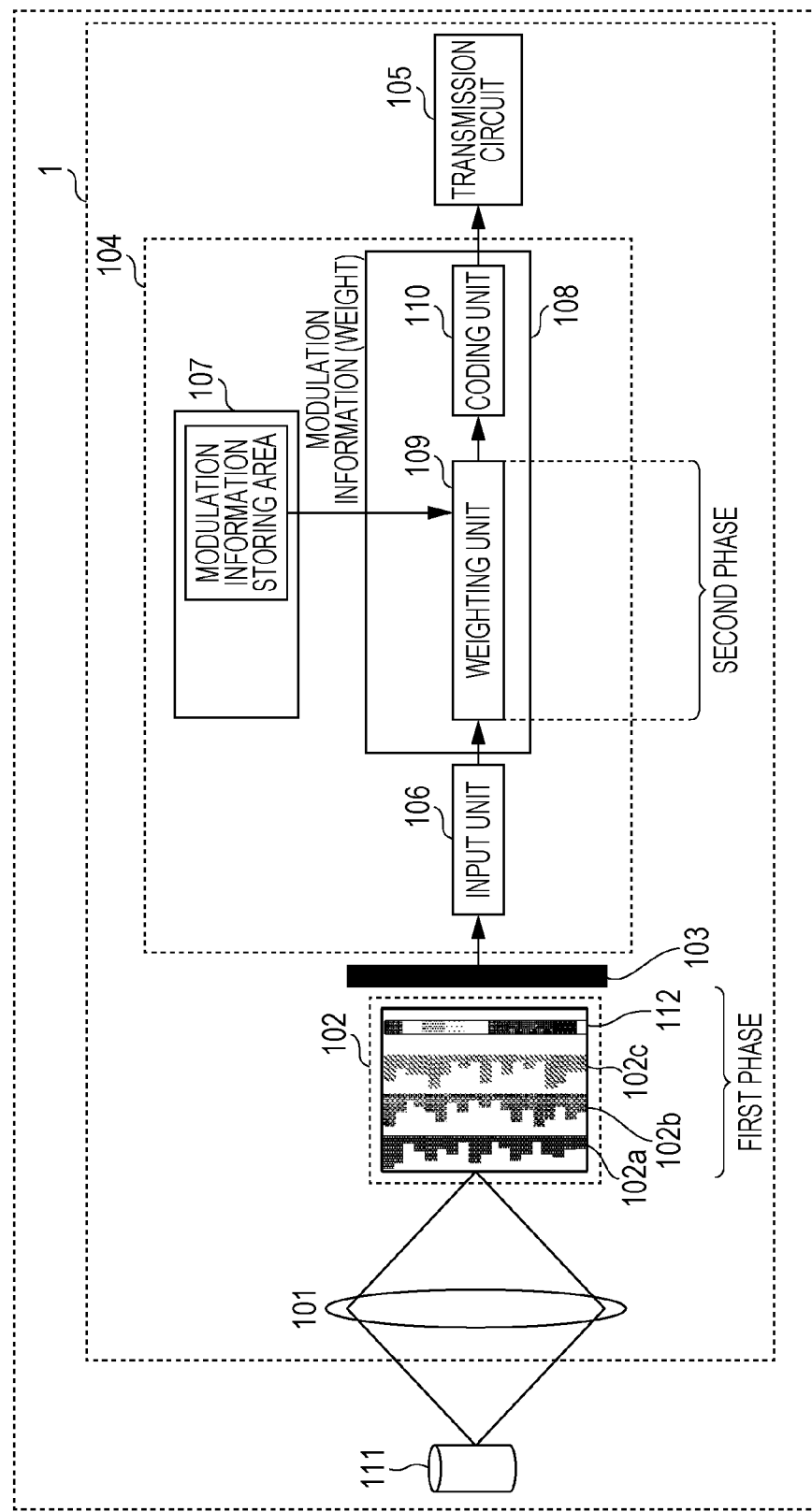
FIG. 19 is a schematic block diagram illustrating an imaging apparatus provided with a spatial light modulator in addition to a plurality of color filters that each differ in the thickness in each pixel according to a third embodiment of the present disclosure.

Next, a third embodiment will be described with reference to FIG. 19. FIG. 19 is a schematic block diagram illustrating an imaging apparatus 1 according to the third embodiment of the present disclosure. In the imaging apparatus 1 according to the third embodiment, unlike the first embodiment, a filter unit 102 includes a spatial light modulator 112 aside from a plurality of color filters (102a through 102c). It is to be noted that, in FIG. 19, the constituent elements that are identical to those in FIG. 2 or 18 are given identical reference characters, and descriptions thereof will be omitted.

As illustrated in FIG. 19, the spatial light modulator 112 that modulates the lightness of the light transmitted through the plurality of color filters (102a through 102c) is provided between the imaging device 103 and the plurality of color filters (102a through 102c). In this case, the light transmission rate characteristic x(λ, u,v) at the position corresponding to the pixel position (u,v) is expressed by the following expression (21).

$$x(\lambda,u,v)=\phi(C1(X),T1(u,v))\cdot\phi(C2(\lambda),T2(u,v))\cdot\phi(C3(\lambda),T3(u,v))\cdot S(u,v) \quad (21)$$

In the expression (21), the overall light transmission rate characteristic of the plurality of color filters (102a through 102c), or in other words, φ(C1(λ),T1(u,v))·φ(C2(λ),T2(u,v))·φ(C3(λ),T3(u,v)) differs randomly in different pixels. Furthermore, the light transmission rate characteristic S(u,v) of the spatial light modulator 112 differs randomly in different pixels. As a result, the overall light transmission rate characteristic of the plurality of color filters (102a through 102c) and the spatial light modulator 112, or in other words, the overall light transmission rate characteristic x(λ, u,v) of the filter unit 102 can be made to differ mutually, randomly, and multiplicatively in different pixels. In addition, the light transmission rate characteristics φ(C1(λ),T1(u,v)), φ(C2(λ),T2(u,v)), and φ(C3(λ),T3(u,v)) of the respective color filters (102a through 102c) at each wavelength differ randomly in different pixels. In this manner, as the light transmission rate characteristic is made to differ multiplicatively and randomly in different pixels and at different wavelengths, the original color image can be reproduced with higher accuracy when the color image is generated with the use of a compressed sensing technique in the image generating apparatus 2.

Furthermore, when a plurality of images are to be captured, by varying the light transmission rate characteristic S(u,v) of the spatial light modulator 112 in each imaging frame in different pixels of the imaging device 103, the overall light transmission rate characteristic x(λ, u,v) of the filter unit 102 can be made to differ randomly in different imaging frames. With this, the randomness is further increased, and, as a result, the original color image can be reproduced with greater accuracy when the color image is generated with the use of a compressed sensing technique in the image generating apparatus.

Thus far, the imaging apparatuses according to one or a plurality of aspects have been described on the basis of the embodiments, but the present disclosure is not limited to these embodiments. Unless departing from the spirit of the present disclosure, an embodiment obtained by making various modifications that are conceivable by a person skilled in the art to the present embodiments or an embodiment obtained by combining the constituent elements in different embodiments may also be included within the scope of the one or the plurality of aspects.

Overview of Embodiments of the Present Disclosure

An imaging apparatus according to an aspect of the present disclosure includes:
- an optical imaging system that converges light from an object;
- an imaging device that includes a plurality of pixels, the imaging device receiving the converged light and converting the received light to an electric signal;
- a filter unit disposed between the optical imaging system and the imaging device, the filter unit including a plurality of color filters having a first group of different light transmission rate characteristics; and
- a transmission data compressing circuit that codes the electric signal,
- wherein an overall light transmission rate characteristic of the filter unit differs randomly in different pixels of the imaging device, and
- wherein the transmission data compressing circuit weights and codes the electric signal of each of the pixels by using a reciprocal of a proportion of the overall light transmission rate characteristic of the filter unit corresponding to each of the plurality of pixels of the imaging device relative to a wavelength characteristic that is common among the pixels.

According to an aspect of the present disclosure, a filter unit that includes a plurality of color filters having different light transmission rate characteristics is provided. When a single color filter in which the light transmission rate characteristic mutually differs in different pixels as in a conventional Bayer array is used, information on a color that is not acquired is interpolated from information on the other colors when a color image is reproduced, which results in an occurrence of a false color. In contrast, in the present aspect, light that includes information on all the colors is received from an object, and thus an occurrence of a false color can be prevented while preventing a decrease in the resolution.

In addition, the overall light transmission rate characteristic of the filter unit differs randomly in different pixels of the imaging device. This is because the light transmission rate characteristics at each wavelength of the plurality of color filters included in the filter unit are made to differ randomly at positions corresponding to the respective pixels of the imaging device. As a result, the overall light transmission rate characteristic of the filter unit that includes the plurality of color filter differs randomly not only in different pixels but also at different wavelengths. With this, the light transmission rate of the light from the object is made to differ randomly and multiplicatively in different pixels and at different wavelengths. A reason why the randomness is increased in this manner is that the original color image can be reproduced with higher accuracy as the randomness is higher in an image generating apparatus to which a coded electric signal is input from the imaging apparatus of the present aspect. Specifically, a color image is generated in the image generating apparatus with the use of a compressed sensing technique, and the difference between the reconstructed data and the original data becomes smaller in the compressed sensing technique as the data is sampled in a more random state when the data is sampled. In light of this feature, the randomness is increased multiplicatively in different pixels and at different wavelengths as described above.

Furthermore, the transmission data compressing circuit weights and codes the electric signal of each of the plurality of pixels by using the reciprocal of the proportion of the overall light transmission rate characteristic of the filter unit corresponding to each of the plurality of pixels of the imaging device relative to the wavelength characteristic that is common among the pixels. With this, the weighted electric signal is approximated to an electric signal obtained by using a color filter having the wavelength characteristic that is common among the pixels. In this manner, the weighted electric signals corresponding to the respective pixels each have a value that is based on the wavelength characteristic that is common among the pixels. Thus, the compressibility comparable to that of the conventional technique that calculates the difference in the electric signal between pixels with the same light transmission rate characteristic and enhances the compressibility can be achieved. With this, even in a case in which an electric signal is acquired with the use of a filter unit of which the light transmission rate characteristic is made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

Meanwhile, in the image generating apparatus to which the coded electric signal is input from the imaging apparatus of the present aspect, as long as the reciprocal of the proportion of the overall light transmission rate characteristic of the filter unit corresponding to each of the plurality of pixels of the imaging device relative to the wavelength characteristic that is common among the pixels has been obtained, the coded electric signal can be restored to an original unweighted electric signal. As a result, even in a case in which the electric signal is acquired with the use of a filter unit of which the light transmission rate characteristic is made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

In addition, in the above aspect, for example, the overall light transmission rate characteristic of the filter unit may be expressed by a linear sum of a second group of different light transmission rate characteristics, and the second group is different from the first group.

According to the above aspect, as the filter unit, a filter unit in which the overall light transmission rate characteristic of the filter unit is expressed by the linear sum of the second group of different light transmission rate characteristics can be used, in which the second group is different from the first group. Here, the second group of different light transmission rate characteristics is the light transmission rate characteristic of each of color images to be reproduced. With this, even in a case in which the electric signal is acquired with the use of the filter unit of which the light transmission rate characteristic is made to differ randomly in different pixels in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

An imaging apparatus according to another aspect of the present disclosure includes:
  an optical imaging system that converges light from an object;
  an imaging device that includes a plurality of pixels, the imaging device receiving the converged light and converting the received light to an electric signal;
  a plurality of color filters disposed between the optical imaging system and the imaging device, the plurality of color filters having different light transmission rate characteristics; and
  a transmission data compressing circuit that codes the electric signal,
  wherein an overall light transmission rate characteristic of the plurality of color filters differs randomly in different pixels of the imaging device, and
  wherein the transmission data compressing circuit weights and codes the electric signal of each of the pixels by using a reciprocal of a proportion of the overall light transmission rate characteristic of the plurality of color filters corresponding to each of the plurality of pixels of the imaging device relative to a wavelength characteristic that is common among the pixels.

According to an aspect of the present disclosure, a plurality of color filters having different light transmission rate characteristics are provided. When a single color filter in which the light transmission rate characteristic mutually differs in different pixels as in a conventional Bayer array is used, information on a color that is not acquired is interpolated from information on the other colors when a color image is reproduced, which results in an occurrence of a false color. In contrast, in the present aspect, light that includes information on all the colors is received from an object, and thus an occurrence of a false color can be prevented while preventing a decrease in the resolution.

In addition, the overall light transmission rate characteristic of the plurality of color filters differs randomly in different pixels of the imaging device. This is because the light transmission rate characteristics at each wavelength of the plurality of color filters are made to differ randomly at positions corresponding to the respective pixels of the imaging device. As a result, the overall light transmission rate characteristic of the plurality of color filter differs randomly not only in different pixels but also at different wavelengths. With this, the light transmission rate characteristic of the light from the object is made to differ randomly and multiplicatively in different pixels and at different wavelengths. A reason why the randomness is increased in this manner is that the original color image can be reproduced with higher accuracy as the randomness is higher in an image generating apparatus to which a coded electric signal is input from the imaging apparatus of the present aspect. Specifically, a color image is generated in the image generating apparatus with the use of a compressed sensing technique, and the difference between the reconstructed data and the original data becomes smaller in the compressed sensing technique as the data is sampled in a more random state when the data is sampled. In light of this feature, the randomness is increased multiplicatively in different pixels and at different wavelengths as described above.

Furthermore, the transmission data compressing circuit weights and codes the electric signal of each of the plurality of pixels by using the reciprocal of the proportion of the overall light transmission rate characteristic of the plurality of color filters corresponding to each of the plurality of pixels of the imaging device relative to the wavelength characteristic that is common among the pixels. With this, the weighted electric signal is approximated to an electric signal obtained by using a color filter having the wavelength characteristic that is common among the pixels. In this manner, the weighted electric signals corresponding to the respective pixels each have a value that is based on the wavelength characteristic that is common among the pixels. Thus, the compressibility comparable to that of the conventional technique that calculates the difference in the electric signal between pixels with the same light transmission rate characteristic and enhances the compressibility can be achieved. With this, even in a case in which an electric signal is acquired with the use of a plurality of color filters of which the light transmission rate characteristics are made to differ randomly in different pixels in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

Meanwhile, in the image generating apparatus to which the coded electric signal is input from the imaging apparatus of the present aspect, as long as the reciprocal of the proportion of the overall light transmission rate characteristic of the plurality of color filters corresponding to each of the plurality of pixels of the imaging device relative to the wavelength characteristic that is common among the pixels has been obtained, the coded electric signal can be restored to an original unweighted electric signal. As a result, even in a case in which the electric signal is acquired with the use of a plurality of color filters of which the light transmission rate characteristics are made to differ randomly in different pixels in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

In addition, in the above aspect, for example, the light transmission rate characteristics of the plurality of color filters at each wavelength may differ randomly at positions corresponding to the respective pixels of the imaging device.

According to the above aspect, the overall light transmission rate characteristic of the plurality of color filters differs randomly in different pixels of the imaging device. In addition, the light transmission rate characteristics at each wavelength of the plurality of color filters are made to differ randomly at positions corresponding to the respective pixels of the imaging device. With this, the light transmission rate characteristic of the light from the object is made to differ randomly and multiplicatively in different pixels and at different wavelengths. Thus, when an original color image is reproduced by using compressed sensing in the image generating apparatus to which the coded electric signal is input from the imaging apparatus of the present aspect, the original color image can be reproduced with higher accuracy.

In addition, in the above aspect, for example, the wavelength characteristic that is common among the pixels may be such that the light transmission rate is the same in all the wavelength bands corresponding to red (R), green (G), and blue (B).

According to the above aspect, the stated wavelength characteristic is a light transmission rate characteristic in which the light transmission rates of the respective components of red (R), green (G), and blue (B) are equal to one another. By weighting an electric signal with the wavelength characteristic that is common among the pixels serving as a reference, the electric signal is converted to a value that is based on the light transmission rate characteristic in which the light transmission rate is the same in all the wavelength bands corresponding to red (R), green (G), and blue (B). In other words, the weighted electric signal is approximated to an electric signal obtained by using a color filter having a light transmission rate characteristic in which the light transmission rate is the same in all the wavelength bands corresponding to red (R), green (G), and blue (B). With this, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

In addition, in the above aspect, for example, the wavelength characteristic that is common among the pixels may indicate the spectral luminous efficiency.

Here, the spectral luminous efficiency represents, in a numerical value, the intensity at which human eyes perceive the brightness of light at each wavelength.

According to the above aspect, by weighting an electric signal with the wavelength characteristic that is common among the pixels serving as a reference, the electric signal is converted to a value that is based on the spectral luminous efficiency. In other words, the weighted electric signal is approximated to an electric signal obtained by using a color filter having a wavelength characteristic that indicates the spectral luminous efficiency. With this, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

In addition, in the above aspect, for example, the wavelength characteristic that is common among the pixels may be a wavelength characteristic approximated to the spectral luminous efficiency.

According to the above aspect, in place of the wavelength characteristic that indicates the spectral luminous efficiency, a wavelength characteristic that is approximated to the spectral luminous efficiency can be used as the wavelength characteristic that is common among the pixels. With this, it becomes unnecessary to strictly stick to the wavelength characteristic that indicates the spectral luminous efficiency, and the number of choices for the wavelength characteristic that is common among the pixels can be increased.

In addition, in the above aspect, for example, the wavelength characteristic that is common among the pixels may be such that the light transmission rate is 0 in wavelength bands corresponding to red (R) and blue (B) and the light transmission rate exceeds 0 only in a wavelength band corresponding to green (G).

Here, the sensitivity of human eyes is highest to green (G) among red (R), green (G), and blue (B).

According to the above aspect, the light transmission rate characteristic in which the light transmission rate is 0 in the wavelength bands corresponding to red (R) and blue (B) and the light transmission rate exceeds 0 in the wavelength band corresponding to green (G) is used as the wavelength characteristic that is common among the pixels. As a result, by weighting an electric signal with the wavelength characteristic that is common among the pixels serving as a reference, the electric signal is converted to a value that is based on the wavelength band of green (G). In other words, the weighted electric signal is approximated to an electric signal obtained by using a color filter having a light transmission rate characteristic in which the light transmission rate is 0 in the wavelength bands corresponding to red (R) and blue (B) and the light transmission rate exceeds 0 only in the wavelength band corresponding to green (G). With this, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

In addition, in the above aspect, for example, the wavelength characteristic that is common among the pixels may indicate a differential characteristic between a red characteristic and a blue characteristic common among the pixels.

According to the above aspect, by weighting an electric signal with the stated wavelength characteristic serving as a reference, the electric signal is converted to a value that is based on the differential characteristic between the red characteristic and the blue characteristic, or in other words, a value that is based on the color difference. In other words, the weighted electric signal is approximated to an electric signal obtained by using a color filter having a wavelength characteristic that indicates the color difference. With this, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

In addition, in the above aspect, for example, a transmission circuit that outputs the coded electric signal of each of the pixels to an image generating apparatus that decodes the coded electric signal of each of the pixels may be provided.

According to the above aspect, the imaging apparatus can output the coded electric signal of each of the pixels to the image generating apparatus via the transmission circuit.

In addition, in the above aspect, for example, the transmission circuit may output, to the image generating apparatus, modulation information that indicates the reciprocal of the proportion of the overall light transmission rate characteristic of the plurality of color filters corresponding to each of the pixels relative to the wavelength characteristic that is common among the pixels.

According to the above aspect, the image generating apparatus can obtain, from the imaging apparatus of the present aspect, the modulation information that indicates the reciprocal of the proportion of the overall light transmission rate characteristic of the plurality of color filters corresponding to each of the pixels relative to the wavelength characteristic that is common among the pixels. Thus, the image generating apparatus can reproduce the weight given to the coded electric signal of each of the pixels.

In addition, in the above aspect, for example, the transmission circuit may output the modulation information and a coded electric signal of each of the pixels corresponding to a first instance of communication in the first instance of communication connected to the image generating apparatus and may output a coded electric signal of each of the pixels corresponding to second and subsequent instances of communication without outputting the modulation information in the second and subsequent instances of communication.

According to the above aspect, the reciprocal of the proportion of the overall light transmission rate characteristic of the plurality of color filters corresponding to each of the pixels relative to the wavelength characteristic that is common among the pixels takes a fixed value unique in the imaging apparatus. Therefore, the imaging apparatus does not need to transmit the modulation information to the image generating apparatus every time.

Thus, as long as the imaging apparatus outputs the modulation information to the image generating apparatus in the first instance of communication connected to the image generating apparatus, thereafter, the image generating apparatus stores the modulation information.

With this, the image generating apparatus can reproduce the weight given to the coded electric signal of each of the pixels by using the stored modulation information.

In addition, in the above aspect, for example, in the image generating apparatus, the coded electric signal may be decoded, and the weight may be removed from the decoded electric signal by using the modulation information.

According to the above aspect, the image generating apparatus can reproduce the weight on the coded electric signal of each of the pixels. Thus, by removing the weight from the decoded electric signal by using the modulation information, the original unweighted electric signal can be reproduced. As a result, even in a case in which the electric signal is acquired with the use of a plurality of color filters of which the light transmission rate characteristics are made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

In addition, in the above aspect, for example, the transmission circuit may output, to the image generating apparatus, specification information that specifies the reciprocal of the proportion of the overall light transmission rate characteristic of the plurality of color filters corresponding to each of the pixels relative to the wavelength characteristic that is common among the pixels.

According to the above aspect, the image generating apparatus can obtain, from the imaging apparatus of the present aspect, the specification information that specifies the reciprocal of the proportion of the overall light transmission rate characteristic of the plurality of color filters corresponding to each of the pixels relative to the wavelength characteristic that is common among the pixels. Thus, the image generating apparatus can reproduce the weight of the coded electric signal of each of the pixels.

Here, the specification information is not the modulation information itself that indicates the reciprocal of the proportion of the overall light transmission rate characteristic of the plurality of color filters corresponding to each of the pixels relative to the wavelength characteristic that is common among the pixels. In the image generating apparatus, if applicable to a plurality of types of imaging apparatuses, modulation information corresponding to each of the plurality of types of imaging apparatuses can be stored in advance.

In this case, the imaging apparatus does not need to output the modulation information itself to the image generating apparatus and may specify the modulation information corresponding to the imaging apparatus stored in the image generating apparatus.

In addition, in the above aspect, for example, the transmission circuit may output the specification information and a coded electric signal of each of the pixels corresponding to a first instance of communication in the first instance of communication connected to the image generating apparatus and may output a coded electric signal of each of the pixels corresponding to second and subsequent instances of communication without outputting the specification information in the second and subsequent instances of communication.

According to the above aspect, the reciprocal of the proportion of the overall light transmission rate characteristic of the plurality of color filters corresponding to each of the pixels relative to the wavelength characteristic that is common among the pixels takes a fixed value unique in the imaging apparatus. Therefore, the imaging apparatus does not need to transmit the specification information that specifies the modulation information to the image generating apparatus every time.

Thus, as long as the imaging apparatus outputs the specification information to the image generating apparatus in the first instance of communication connected to the image generating apparatus, thereafter, the image generating apparatus stores the specification information. The image generating apparatus can specify the stored modulation information on the basis of the specification information. With this, the image generating apparatus can reproduce the weight given to the coded electric signal of each of the pixels by using the stored modulation information.

In addition, in the above aspect, for example,
in the image generating apparatus,
the modulation information that indicates the reciprocal of the proportion of the overall light transmission rate characteristic of the plurality of color filters corresponding to each of the pixels of the imaging device included in each of a plurality of types of imaging apparatuses relative to the wavelength characteristic that is common among the pixels may be stored,
the coded electric signal may be decoded,
the modulation information corresponding to the imaging apparatus that has output the coded electric signal may be selected from the stored modulation information on the basis of the specification information, and
the weight may be removed from the decoded electric signal by using the selected modulation information.

According to the above aspect, the image generating apparatus can reproduce the weight on the coded electric signal of each of the pixels. Thus, by removing the weight from the decoded electric signal by using the modulation information, the original unweighted electric signal can be reproduced. As a result, even in a case in which the electric signal is acquired with the use of a plurality of color filters of which the light transmission rate characteristics are made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

The plurality of color filters may include a first color filter corresponding to a wavelength band of cyan (C), a second color filter corresponding to a wavelength band of magenta (M), and a third color filter corresponding to a wavelength band of yellow (Y).

According to the above aspect, the light from the object is received through the first color filter, the second color filter, and the third color filter. The electric signals of all the pixels reflect the primary colors of the object with the use of the three primary colors of a coloring material and include information on all the colors. Therefore, an occurrence of a false color can be prevented while preventing a decrease in the resolution.

An imaging apparatus according to another aspect of the present disclosure includes:
   an optical imaging system that converges light from an object;
   an imaging device that includes a plurality of pixels, the imaging device receiving the converged light and converting the received light to an electric signal;
   a plurality of color filters disposed between the optical imaging system and the imaging device, the plurality of color filters having different light transmission rate characteristics;
   a spatial light modulator disposed between the imaging device and the plurality of color filters, the spatial light modulator modulating a light transmission rate characteristic of light transmitted through the plurality of color filters; and
   a transmission data compressing circuit that codes the electric signal,
   wherein the light transmission rate characteristic of the spatial light modulator differs randomly in different pixels of the imaging device,
   wherein an overall light transmission rate characteristic of the plurality of color filters and the spatial light modulator differs randomly in different pixels of the imaging device, and
   wherein the transmission data compressing circuit weights and codes the electric signal of each of the pixels by using a reciprocal of a proportion of the overall light transmission rate characteristic of the plurality of color filters and the spatial light modulator corresponding to each of the plurality of pixels of the imaging device relative to a wavelength characteristic that is common among the pixels.

According to an aspect of the present disclosure, a plurality of color filters having different light transmission rate characteristics are provided. When a single color filter in which the light transmission rate characteristic mutually differs in different pixels as in a conventional Bayer array is used, information on a color that is not acquired is interpolated from information on the other colors when a color image is reproduced, which results in an occurrence of a false color. In contrast, in the present aspect, light that includes information on all the colors is received from an object, and thus an occurrence of a false color can be prevented while preventing a decrease in the resolution.

In addition, the spatial light modulator that modulates the lightness of the light transmitted through the plurality of color filters is provided between the imaging device and the plurality of color filters. With this, even if the structure of the plurality of color filters is simplified by making the light transmission rate characteristics of the plurality of color filters at each wavelength substantially the same, the overall light transmission rate characteristic of the plurality of color filters and the spatial light modulator can be made to differ randomly in different pixels of the imaging device by interposing the spatial light modulator. Therefore, even in a case in which the number of patterns of the light transmission rate characteristics corresponding to the respective pixels is restricted by simplifying the structure of the plurality of color filters, the use of the spatial light modulator makes it possible to increase the number of patterns of the light transmission rate characteristics corresponding to the respective pixels. As a result, even in a case in which the structure of the plurality of color filters is simplified, the reproduction quality of the reconstructed image can be improved.

Furthermore, according to the above aspect, the transmission data compressing circuit weights and codes the electric signal of each of the pixels by using the reciprocal of the proportion of the overall light transmission rate characteristic of the plurality of color filters and the spatial light modulator corresponding to each of the plurality of pixels of the imaging device relative to the wavelength characteristic that is common among the pixels. With this, the weighted electric signal is approximated to an electric signal obtained by using a color filter having the wavelength characteristic that is common among the pixels. In this manner, the weighted electric signals corresponding to the respective pixels each have a value that is based on the wavelength characteristic that is common among the pixels. Thus, the compressibility comparable to that of the conventional technique that calculates the difference in the electric signal between pixels with the same light transmission rate characteristic and enhances the compressibility can be achieved. With this, even in a case in which the electric signal is acquired with the overall light transmission rate characteristic of the plurality of color filters and the spatial light modulator made to differ randomly in different pixels of the imaging device in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

In addition, in the above aspect, for example, each of the plurality of color filters may include an area having a thickness of 0 mm.

According to the above aspect, as each of the plurality of color filters includes an area having a thickness of 0 mm, the overall light transmission rate characteristic of the plurality of color filters can be made to differ in different pixels.

In this case, for example, when three color filters are used, eight types of overall light transmission rate characteristics of the plurality of color filters can be created. By adding the spatial light modulator thereto, the number of types can be increased over the stated eight types.

With this, even in a case in which the structure of the plurality of color filters is simplified, the reproduction quality of the reconstructed image can be improved.

An imaging apparatus according to another aspect of the present disclosure includes:
   an optical imaging system that converges light from an object;
   an imaging device that includes a plurality of pixels, the imaging device receiving the converged light and converting the received light to an electric signal;
   a plurality of color filters disposed between the optical imaging system and the imaging device, the plurality of color filters having different light transmission rate characteristics;
   a spatial light modulator disposed between the imaging device and the plurality of color filters, the spatial light modulator modulating a light transmission rate characteristic of light transmitted through the plurality of color filters; and
   a transmission data compressing circuit that codes the electric signal, wherein an overall light transmission rate characteristic of the plurality of color filters differs randomly in different pixels of the imaging device, wherein, the light transmission rate characteristics of the plurality of color filters at each wavelength differ randomly at positions corresponding to the respective pixels of the imaging device, wherein the light transmission rate characteristic of the spatial light modulator differs randomly in different pixels of the imaging device, and wherein the transmission data compressing circuit weights and codes the electric signal of each of the pixels by using a reciprocal of a proportion of the overall light transmission rate characteristic of the plurality of color filters and the spatial light modulator corresponding to each of the plurality of pixels of the imaging device relative to a wavelength characteristic that is common among the pixels.

According to an aspect of the present disclosure, a plurality of color filters having different light transmission rate characteristics are provided. When a single color filter in which the light transmission rate characteristic mutually differs in different pixels as in a conventional Bayer array is used, information on a color that is not acquired is interpolated from information on the other colors when a color image is reproduced, which results in an occurrence of a false color. In contrast, in the present aspect, light that includes information on all the colors is received from an object, and thus an occurrence of a false color can be prevented while preventing a decrease in the resolution.

In addition, the overall light transmission rate characteristic of the plurality of color filters differs randomly in different pixels of the imaging device. Furthermore, the spatial light modulator that modulates the lightness of the light transmitted through the plurality of color filters is provided between the imaging device and the plurality of color filters, and the light transmission rate characteristic of the spatial light modulator differs randomly in different pixels of the imaging device. With this, the overall light transmission rate characteristic of the plurality of color filters and the spatial light modulator can be made to differ mutually, multiplicatively, and randomly in different pixels of the imaging device. In addition, the light transmission rate characteristics of the plurality of color filters at each wavelength differ randomly at positions corresponding to the respective pixels of the imaging device. In this manner, as the light transmission rate characteristic is made to differ multiplicatively and randomly in different pixels and at different wavelengths, the original color image can be reproduced with higher accuracy when the color image is generated with the use of a compressed sensing technique in the image generating apparatus.

Furthermore, when a plurality of images are to be captured, by varying the light transmission rate characteristic of the spatial light modulator in each imaging frame in different pixels of the imaging device, the overall light transmission rate characteristic of the plurality of color filters and the spatial light modulator can be made to differ randomly in different imaging frames as well. With this, the randomness is further increased, and, as a result, the original color image can be reproduced with greater accuracy when a color image is generated with the use of the compressed sensing technique in the image generating apparatus.

In addition, according to the above aspect, the transmission data compressing circuit weights and codes the electric signal of each of the pixels by using the reciprocal of the proportion of the overall light transmission rate characteristic of the plurality of color filters and the spatial light modulator corresponding to each of the plurality of pixels of the imaging device relative to the wavelength characteristic that is common among the pixels. With this, the weighted electric signal is approximated to an electric signal obtained by using a color filter having the wavelength characteristic that is common among the pixels. In this manner, the weighted electric signals corresponding to the respective pixels each have a value that is based on the wavelength characteristic that is common among the pixels. Thus, the compressibility comparable to that of the conventional technique that calculates the difference in the electric signal between pixels with the same wavelength characteristic and enhances the compressibility can be achieved. With this, even in a case in which the electric signal is acquired with the use of a plurality of color filters of which the light transmission rate characteristics are made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

An imaging system according to another aspect of the present disclosure includes:
  an imaging apparatus; and
  an image generating apparatus,
  wherein the imaging apparatus includes
    an optical imaging system that converges light from an object,
    an imaging device that includes a plurality of pixels, the imaging device receiving the converged light and converting the received light to an electric signal,
    a filter unit disposed between the optical imaging system and the imaging device, the filter unit including a plurality of color filters having different light transmission rate characteristics,
    a transmission data compressing circuit that codes the electric signal, and
    a transmission circuit connected to the image generating apparatus,
  wherein an overall light transmission rate characteristic of the filter unit differs randomly in different pixels of the imaging device,
  wherein the transmission data compressing circuit weights and codes the electric signal of each of the pixels by using a reciprocal of a proportion of the overall light transmission rate characteristic of the filter unit corresponding to each of the plurality of pixels of the imaging device relative to a wavelength characteristic that is common among the pixels,
  wherein the transmission circuit outputs the coded electric signal of each of the pixels to the image generating apparatus, and
  wherein the image generating apparatus includes
    a memory that stores modulation information that indicates the reciprocal of the proportion of the overall light transmission rate characteristic of the filter unit corresponding to each of the pixels relative to the wavelength characteristic that is common among the pixels,
    a reception circuit that receives the coded electric signal of each of the pixels, and
    a received data decoding circuit that decodes the coded electric signal of each of the pixels and removes the weight from the decoded electric signal by using the reciprocal of the proportion of the overall light transmission rate characteristic of the filter unit corresponding to each of the pixels relative to the wavelength characteristic that is common among the pixels.

According to an aspect of the present disclosure, the imaging system can reproduce the original unweighted electric signal of the coded electric signal as long as the reciprocal of the proportion of the overall light transmission rate characteristic of the filter unit corresponding to each of the pixels relative to the wavelength characteristic that is common among the pixels has been obtained in the image generating apparatus to which the coded electric signal is input from the imaging apparatus of the present aspect. As a result, even in a case in which the electric signal is acquired with the use of a filter unit of which the light transmission rate characteristic is made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

An imaging method according to another aspect of the present disclosure is a method of imaging by using an imaging apparatus that includes
　an optical imaging system that converges light from an object,
　an imaging device that includes a plurality of pixels, the imaging device receiving the converged light and converting the received light to an electric signal,
　a filter unit disposed between the optical imaging system and the imaging device, the filter unit including a plurality of color filters having different light transmission rate characteristics, and
　a transmission data compressing circuit that codes the electric signal,
　wherein an overall light transmission rate characteristic of the filter unit differs randomly in different pixels of the imaging device, and
　wherein in the transmission data compressing circuit,
　　a reciprocal of a proportion of the overall light transmission rate characteristic of the filter unit corresponding to each of the plurality of pixels of the imaging device relative to a wavelength characteristic that is common among the pixels is stored,
　　the electric signal of each of the pixels is input from the imaging device, and
　　the electric signal of each of the pixels is weighted and coded by using the reciprocal of the proportion of the overall light transmission rate characteristic of the filter unit corresponding to each of the pixels relative to the wavelength characteristic that is common among the pixels.

According to an aspect of the present disclosure, with the above imaging method, even in a case in which the electric signal is acquired with the use of a filter unit of which the light transmission rate characteristic is made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

A recording medium according to another aspect of the present disclosure is
　a recording medium having a control program that causes an imaging apparatus provided with a processor to execute processing,
　wherein the recording medium is nonvolatile and is computer readable,
　wherein the imaging apparatus includes
　　an optical imaging system that converges light from an object,
　　an imaging device that includes a plurality of pixels, the imaging device receiving the converged light and converting the received light to an electric signal,
　　a filter unit disposed between the optical imaging system and the imaging device, the filter unit including a plurality of color filters having different light transmission rate characteristics, and
　　a transmission data compressing circuit that codes the electric signal,
　wherein an overall light transmission rate characteristic of the filter unit differs randomly in different pixels of the imaging device, and
　wherein the processing causes
　the processor to execute
　　processing of storing a reciprocal of a proportion of the overall light transmission rate characteristic of the filter unit corresponding to each of the plurality of pixels of the imaging device relative to a wavelength characteristic that is common among the pixels,
　　processing of inputting the electric signal of each of the pixels from the imaging device, and
　　processing of weighting and coding the electric signal of each of the pixels by using the reciprocal of the proportion of the overall light transmission rate characteristic of the filter unit corresponding to each of the pixels relative to the wavelength characteristic that is common among the pixels.

According to an aspect of the present disclosure, by using the above recording medium, even in a case in which the electric signal is acquired with the use of a filter unit of which the light transmission rate characteristic is made to differ randomly in different pixels and at different wavelengths in order to increase the reproducibility of a color image, the transmission compression efficiency can be improved to a level comparable to that of the conventional technique that uses a single color filter that transmits light in any one of the red (R), green (G), and blue (B) wavelength bands in a given pixel, while preventing a decrease in the resolution and an occurrence of a false color.

An imaging apparatus according to another aspect of the present disclosure includes:
　an optical imaging system that converges light from an object;
　an imaging device including pixels, the pixels including a first pixel and a second pixel, the pixels outputting pixel values including a first pixel value output from the first pixel and a second pixel value output from the second pixel, the pixels corresponding to the respective pixel values;
　a filter unit including a first color filter having a first light transmission rate characteristic, a second color filter having a second light transmission rate characteristic, and a third color filter having a third light transmission rate characteristic, the filter unit being provided between the optical imaging system and the imaging device, the first light transmission rate characteristic, the second light transmission rate characteristic, and the third light transmission rate characteristic being different from one another;
a memory that stores weighting values including a first weighting value and a second weighting value, the weighting values corresponding to the respective pixels, the weighting values corresponding to the respective pixel values, the first weighting value corresponding to the first pixel value, the second weighting value corresponding to the second pixel value; and
a controller that (i) obtains weighted values of the pixels by using the pixel values and the weighting values, and (ii) codes the weighted values, the weighted values including a first weighted value of the first pixel and a second weighted value of the second pixel, the controller obtaining the first weighted value using the first pixel value and the first weighting value, the controller obtaining the second weighted value using the second pixel value and the second weighting value, the controller coding the first weighted value and the second weighted value,
wherein the filer unit has areas including a first area and a second area, and the areas and the pixels are in one-to-one relationship, wherein the first pixel corresponds to the first area, and the second pixel corresponds to the second area,
wherein a first thickness of the first color filter included in the first area is different from a second thickness of the first color filter included in the second area, a third thickness of the second color filter included in the first area is different from a fourth thickness of the second color filter included in the second area, a fifth thickness of the third color filter included in the first area is different from a sixth thickness of the third color filter included in the second area, a first light transmission characteristic of the first area is determined on the basis of the first thickness, the third thickness, and the fifth thickness, and a second light transmission characteristic of the second area is determined on the basis of the second thickness, the fourth thickness, and the sixth thickness,
wherein a fourth light transmission rate characteristic is predetermined and corresponds to the first light transmission rate characteristic and a first constant, a fifth light transmission rate characteristic is predetermined and corresponds to the second light transmission rate characteristic and a second constant, a sixth light transmission rate characteristic is predetermined and corresponds to the third light transmission rate characteristic and a third constant, and the fourth light transmission rate characteristic, the fifth light transmission rate characteristic, and sixth light transmission rate characteristic are different from the first light transmission rate characteristic, the second light transmission rate characteristic, and the third light transmission rate characteristic, respectively, and
wherein the first weighting value is determined by using the fourth light transmission rate characteristic, the first constant, the fifth light transmission rate characteristic, the second constant, the sixth light transmission rate characteristic, the third constant, and the first light transmission characteristic, and the second weighting value is determined by using the fourth light transmission rate characteristic, the first constant, the fifth light transmission rate characteristic, the second constant, the sixth light transmission rate characteristic, the third constant, and the second light transmission characteristic.

The imaging system according to the exemplary embodiments of the present disclosure is useful in reducing the amount of transmission data while improving the image quality.

What is claimed is:
1. An imaging apparatus, comprising:
an optical imaging system that converges light from an object;
an imaging device that includes a plurality of pixels, the imaging device receiving the converged light and converting the received light to an electric signal;
a plurality of color filters disposed between the optical imaging system and the imaging device, the plurality of color filters having different light transmission rate characteristics; and
a transmission data compressing circuit that codes the electric signal,
wherein an overall light transmission rate characteristic of the plurality of color filters differs randomly in different pixels of the imaging device, and
wherein the transmission data compressing circuit weights and codes the electric signal of each of the pixels by using a reciprocal of a proportion of the overall light transmission rate characteristic of the plurality of color filters corresponding to each of the plurality of pixels of the imaging device relative to a wavelength characteristic that is common among the pixels.
2. The imaging apparatus according to claim 1, wherein the light transmission rate characteristics of the plurality of color filters at each wavelength differ randomly at positions corresponding to the respective pixels of the imaging device.
3. The imaging apparatus according to claim 1, wherein the wavelength characteristic that is common among the pixels indicates a spectral luminous efficiency.
4. The imaging apparatus according to claim 1, wherein the wavelength characteristic that is common among the pixels is a wavelength characteristic approximated to a spectral luminous efficiency.
5. The imaging apparatus according to claim 1, wherein the wavelength characteristic that is common among the pixels is a wavelength characteristic in which a light transmission rate is the same in all wavelength bands corresponding to red (R), green (G), and blue (B).
6. The imaging apparatus according to claim 1, wherein the wavelength characteristic that is common among the pixels is such that a light transmission rate is 0 in wavelength bands corresponding to red (R) and blue (B) and the light transmission rate exceeds 0 only in a wavelength band corresponding to green (G).
7. The imaging apparatus according to claim 1, wherein the wavelength characteristic that is common among the pixels indicates a differential characteristic between a red characteristic and a blue characteristic common among the pixels.
8. The imaging apparatus according to claim 1, further comprising:
a transmission circuit that outputs a coded electric signal of each of the pixels to an image generating apparatus that decodes the electric signal.

9. The imaging apparatus according to claim 8,
wherein the transmission circuit outputs, to the image generating apparatus, modulation information that indicates the reciprocal of the proportion of the overall light transmission rate characteristic of the plurality of color filters corresponding to each of the pixels relative to the wavelength characteristic that is common among the pixels.

10. The imaging apparatus according to claim 9,
wherein the transmission circuit outputs the modulation information and the coded electric signal of each of the pixels corresponding to a first instance of communication in the first instance of communication connected to the image generating apparatus and outputs the coded electric signal of each of the pixels corresponding to second and subsequent instances of communication without outputting the modulation information in the second and subsequent instances of communication.

11. The imaging apparatus according to claim 9,
wherein, in the image generating apparatus,
the coded electric signal is decoded, and
the weight is removed from the decoded electric signal by using the modulation information.

12. The imaging apparatus according to claim 8,
wherein the transmission circuit outputs, to the image generating apparatus, specification information that specifies the reciprocal of the proportion of the overall light transmission rate characteristic of the plurality of color filters corresponding to each of the pixels relative to the wavelength characteristic that is common among the pixels.

13. The imaging apparatus according to claim 12,
wherein the transmission circuit outputs the specification information and the coded electric signal of each of the pixels corresponding to a first instance of communication in the first instance of communication connected to the image generating apparatus and outputs the coded electric signal of each of the pixels corresponding to second and subsequent instances of communication without outputting the specification information in the second and subsequent instances of communication.

14. The imaging apparatus according to claim 12,
wherein, in the image generating apparatus,
modulation information that indicates the reciprocal of the proportion of the overall light transmission rate characteristic of the plurality of color filters corresponding to each of the pixels of the imaging device included in each of a plurality of types of imaging apparatuses relative to the wavelength characteristic that is common among the pixels is stored,
the coded electric signal is decoded,
the modulation information corresponding to the imaging apparatus that has output the coded electric signal is selected from the stored modulation information on the basis of the specification information, and
the weight is removed from the decoded electric signal by using the selected modulation information.

15. The imaging apparatus according to claim 1,
wherein the plurality of color filters include
a first color filter corresponding to a wavelength band of cyan (C),
a second color filter corresponding to a wavelength band of magenta (M), and
a third color filter corresponding to a wavelength band of yellow (Y).

16. An imaging apparatus, comprising:
an optical imaging system that converges light from an object;
an imaging device that includes a plurality of pixels, the imaging device receiving the converged light and converting the received light to an electric signal;
a plurality of color filters disposed between the optical imaging system and the imaging device, the plurality of color filters having different light transmission rate characteristics;
a spatial light modulator that modulates a light transmission rate characteristic of light transmitted through the plurality of color filters; and
a transmission data compressing circuit that codes the electric signal,
wherein the light transmission rate characteristic of the spatial light modulator differs randomly in different pixels of the imaging device,
wherein the overall light transmission rate characteristic of the plurality of color filters and the spatial light modulator differs randomly in different pixels of the imaging device, and
wherein the transmission data compressing circuit weights and codes the electric signal of each of the pixels by using a reciprocal of a proportion of the overall light transmission rate characteristic of the plurality of color filters and the spatial light modulator corresponding to each of the plurality of pixels relative to a wavelength characteristic that is common among the pixels.

17. The imaging apparatus according to claim 16,
wherein each of the plurality of color filters includes an area having a thickness of 0 mm.

18. An imaging apparatus, comprising:
an optical imaging system that converges light from an object;
an imaging device that includes a plurality of pixels, the imaging device receiving the converged light and converting the received light to an electric signal;
a plurality of color filters disposed between the optical imaging system and the imaging device, the plurality of color filters having different light transmission rate characteristics;
a spatial light modulator that modulates a light transmission rate characteristic of light transmitted through the plurality of color filters; and
a transmission data compressing circuit that codes the electric signal,
wherein an overall light transmission rate characteristic of the plurality of color filters differs randomly in different pixels of the imaging device,
wherein the light transmission rate characteristics of the plurality of color filters at each wavelength differ randomly at positions corresponding to the respective pixels of the imaging device,
wherein the light transmission rate characteristic of the spatial light modulator differs randomly in different pixels of the imaging device, and
wherein the transmission data compressing circuit weights and codes the electric signal of each of the pixels by using a reciprocal of a proportion of the overall light transmission rate characteristic of the plurality of color filters and the spatial light modulator corresponding to each of the plurality of pixels of the imaging device relative to a wavelength characteristic that is common among the pixels.

19. An imaging system, comprising:
an imaging apparatus; and
an image generating apparatus,
wherein the imaging apparatus includes
  an optical imaging system that converges light from an object,
  an imaging device that includes a plurality of pixels, the imaging device receiving the converged light and converting the received light to an electric signal,
  a filter unit disposed between the optical imaging system and the imaging device, the filter unit including a plurality of color filters having different light transmission rate characteristics,
  a transmission data compressing circuit that codes the electric signal, and
  a transmission circuit connected to the image generating apparatus,
wherein an overall light transmission rate characteristic of the filter unit differs randomly in different pixels of the imaging device,
wherein the transmission data compressing circuit weights and codes the electric signal of each of the pixels by using a reciprocal of a proportion of the overall light transmission rate characteristic of the filter unit corresponding to each of the plurality of pixels of the imaging device relative to a wavelength characteristic that is common among the pixels,
wherein the transmission circuit outputs a coded electric signal of each of the pixels to the image generating apparatus, and
wherein the image generating apparatus includes
  a memory that stores modulation information that indicates the reciprocal of the proportion of the overall light transmission rate characteristic of the filter unit corresponding to each of the pixels relative to the wavelength characteristic that is common among the pixels,
  a reception circuit that receives the coded electric signal of each of the pixels, and
  a received data decoding circuit that decodes the coded electric signal of each of the pixels and removes the weight from the decoded electric signal by using the reciprocal of the proportion of the overall light transmission rate characteristic of the filter unit corresponding to each of the pixels relative to the wavelength characteristic that is common among the pixels.

20. A method of imaging by using an imaging apparatus that includes
an optical imaging system that converges light from an object,
an imaging device that includes a plurality of pixels, the imaging device receiving the converged light and converting the received light to an electric signal,
a filter unit disposed between the optical imaging system and the imaging device, the filter unit including a plurality of color filters having different light transmission rate characteristics, and
a transmission data compressing circuit that codes the electric signal,
wherein an overall light transmission rate characteristic of the filter unit differs randomly in different pixels of the imaging device, and
wherein in the transmission data compressing circuit,
  a reciprocal of a proportion of the overall light transmission rate characteristic of the filter unit corresponding to each of the plurality of pixels of the imaging device relative to a wavelength characteristic that is common among the pixels is stored,
  the electric signal of each of the pixels is input from the imaging device, and
  the electric signal of each of the pixels is weighted and coded by using the reciprocal of the proportion of the overall light transmission rate characteristic of the filter unit corresponding to each of the pixels relative to the wavelength characteristic that is common among the pixels.

21. A non-transitory recording medium having a control program that causes an imaging apparatus provided with a processor to execute processing, wherein the recording medium is nonvolatile and is computer readable, wherein the imaging apparatus includes an optical imaging system that converges light from an object, an imaging device that includes a plurality of pixels, the imaging device receiving the converged light and converting the received light to an electric signal, a filter unit disposed between the optical imaging system and the imaging device, the filter unit including a plurality of color filters having different light transmission rate characteristics, and a transmission data compressing circuit that codes the electric signal, wherein an overall light transmission rate characteristic of the filter unit differs randomly in different pixels of the imaging device, and wherein the processing causes the processor to execute processing of storing a reciprocal of a proportion of the overall light transmission rate characteristic of the filter unit corresponding to each of the plurality of pixels of the imaging device relative to the wavelength characteristic that is common among the pixels, processing of inputting the electric signal of each of the pixels from the imaging device, and processing of weighting and coding the electric signal of each of the pixels by using the reciprocal of the proportion of the overall light transmission rate characteristic of the filter unit corresponding to each of the pixels relative to the wavelength characteristic that is common among the pixels.

22. An imaging apparatus, comprising:
an optical imaging system that converges light from an object;
an imaging device including pixels, the pixels including a first pixel and a second pixel, the pixels outputting pixel values including a first pixel value output from the first pixel and a second pixel value output from the second pixel, the pixels corresponding to the respective pixel values;
a filter unit including a first color filter having a first light transmission rate characteristic, a second color filter having a second light transmission rate characteristic, and a third color filter having a third light transmission rate characteristic, the filter unit being provided between the optical imaging system and the imaging device, the first light transmission rate characteristic, the second light transmission rate characteristic, and the third light transmission rate characteristic being different from one another;
a memory that stores weighting values including a first weighting value and a second weighting value, the weighting values corresponding to the respective pixels, the weighting values corresponding to the respective pixel values, the first weighting value corresponding to the first pixel value, the second weighting value corresponding to the second pixel value; and
a controller that (i) obtains weighted values of the pixels by using the pixel values and the weighting values, and (ii) codes the weighted values, the weighted values including a first weighted value of the first pixel and a second weighted value of the second pixel, the controller obtaining the first weighted value using the first pixel value and the first weighting value, the controller obtaining the second weighted value using the second pixel value and the second weighting value, the controller coding the first weighted value and the second weighted value, wherein the filer unit has areas including a first area and a second area, and the areas and the pixels are in one-to-one relationship, wherein the first pixel corresponds to the first area, and the second pixel corresponds to the second area, wherein a first thickness of the first color filter included in the first area is different from a second thickness of the first color filter included in the second area, a third thickness of the second color filter included in the first area is different from a fourth thickness of the second color filter included in the second area, a fifth thickness of the third color filter included in the first area is different from a sixth thickness of the third color filter included in the second area, a first light transmission characteristic of the first area is determined on the basis of the first thickness, the third thickness, and the fifth thickness, and a second light transmission characteristic of the second area is determined on the basis of the second thickness, the fourth thickness, and the sixth thickness, wherein a fourth light transmission rate characteristic is predetermined and corresponds to the first light transmission rate characteristic and a first constant, a fifth light transmission rate characteristic is predetermined and corresponds to the second light transmission rate characteristic and a second constant, a sixth light transmission rate characteristic is predetermined and corresponds to the third light transmission rate characteristic and a third constant, and the fourth light transmission rate characteristic, the fifth light transmission rate characteristic, and sixth light transmission rate characteristic are different from the first light transmission rate characteristic, the second light transmission rate characteristic, and the third light transmission rate characteristic, respectively, and wherein the first weighting value is determined by using the fourth light transmission rate characteristic, the first constant, the fifth light transmission rate characteristic, the second constant, the sixth light transmission rate characteristic, the third constant, and the first light transmission characteristic, and the second weighting value is determined by using the fourth light transmission rate characteristic, the first constant, the fifth light transmission rate characteristic, the second constant, the sixth light transmission rate characteristic, the third constant, and the second light transmission characteristic.

* * * * *